US012604122B2

(12) United States Patent
Hara et al.

(10) Patent No.: US 12,604,122 B2
(45) Date of Patent: Apr. 14, 2026

(54) OPTICAL ACCESS SYSTEM AND CONTROL SIGNAL SUPERIMPOSITION METHOD

(71) Applicant: NTT, Inc., Tokyo (JP)

(72) Inventors: Kazutaka Hara, Musashino (JP); Junichi Kani, Musashino (JP); Shin Kaneko, Musashino (JP); Takuya Kanai, Musashino (JP); Yumiko Senoo, Musashino (JP)

(73) Assignee: NTT, Inc., Tokyo (JP)

( * ) Notice: Subject to any disclaimer, the term of this patent is extended or adjusted under 35 U.S.C. 154(b) by 176 days.

(21) Appl. No.: 18/286,401

(22) PCT Filed: Apr. 19, 2021

(86) PCT No.: PCT/JP2021/015849
    § 371 (c)(1),
    (2) Date: Oct. 11, 2023

(87) PCT Pub. No.: WO2022/224298
    PCT Pub. Date: Oct. 27, 2022

(65) Prior Publication Data
    US 2024/0381012 A1     Nov. 14, 2024

(51) Int. Cl.
    *H04Q 11/00*     (2006.01)
    *H04J 14/02*     (2006.01)
(52) U.S. Cl.
    CPC ...... *H04Q 11/0067* (2013.01); *H04J 14/0307* (2023.08); *H04Q 11/0071* (2013.01); *H04Q 2011/0083* (2013.01)
(58) Field of Classification Search
    CPC ............. H04J 14/0307; H04Q 11/0067; H04Q 11/0071

(Continued)

(56) References Cited

U.S. PATENT DOCUMENTS 5,894,362  A     4/1999  Onaka et al.
6,335,810  B1    1/2002  Uehara
        (Continued)

FOREIGN PATENT DOCUMENTS

JP     H05-130058 A     5/1993
JP     2001-160820 A    6/2001
        (Continued)

OTHER PUBLICATIONS

Nakagawa et al; Experimental Investigation of AMCC Superimposition Impact on CPRI Signal Transmission in DWDM-PON Network, Sep. 2016, 42nd European Conference and Exhibition on Optical Communications; pp. 1-3. (Year: 2016).*

(Continued)

*Primary Examiner* — Amritbir K Sandhu

(57) ABSTRACT

Provided is an optical access system that performs communication using an optical signal on which a management control signal used for management and control is superimposed, the optical access system including: a subscriber device on a transmitting side that generates an optical signal by superimposing the management control signal on a main signal and transmits the generated optical signal; a management control unit that outputs a management control signal which is superimposed on the optical signal transmitted by the subscriber device on the transmitting side and which has a frequency band different from a frequency of the management control signal superimposed on the optical signal; and a control signal superimposing unit that superimposes the management control signal output from the management control unit on the optical signal.

8 Claims, 18 Drawing Sheets

(58) Field of Classification Search
USPC ............................................................. 398/58
See application file for complete search history.

(56) References Cited

U.S. PATENT DOCUMENTS

| | | | |
|---|---|---|---|
| 6,891,995 B2 | 5/2005 | Ikushima et al. | |
| 8,886,036 B2 | 11/2014 | Jeong et al. | |
| 9,071,378 B2 | 6/2015 | Hoshida | |
| 9,100,121 B2 * | 8/2015 | Lee ...................... | H04B 10/272 |
| 10,797,799 B2 | 10/2020 | Nakagawa et al. | |
| 2002/0101635 A1 | 8/2002 | Taketomi | |
| 2006/0133806 A1 * | 6/2006 | Krimmel .............. | H04B 10/071 |
| | | | 398/33 |
| 2008/0166119 A1 | 7/2008 | Ryu et al. | |
| 2008/0166122 A1 | 7/2008 | Hsiao | |
| 2010/0086304 A1 | 4/2010 | Mizutani et al. | |
| 2011/0116798 A1 | 5/2011 | Kai | |
| 2012/0148239 A1 | 6/2012 | Mori et al. | |
| 2015/0229389 A1 * | 8/2015 | Kim ...................... | H04B 10/073 |
| | | | 398/17 |
| 2017/0155981 A1 | 6/2017 | Nakagawa et al. | |
| 2017/0279538 A1 | 9/2017 | Sone et al. | |
| 2018/0359024 A1 | 12/2018 | Oda et al. | |
| 2019/0058541 A1 | 2/2019 | Abe | |
| 2020/0136722 A1 * | 4/2020 | Urban ................ | H04B 10/0779 |
| 2020/0295845 A1 * | 9/2020 | Funada .................... | H04L 12/44 |
| 2024/0187092 A1 * | 6/2024 | Senoo ................. | H04J 14/0276 |
| 2025/0088777 A1 * | 3/2025 | Senoo ................ | H04Q 11/0062 |

FOREIGN PATENT DOCUMENTS

| | | | | |
|---|---|---|---|---|
| JP | 2006319894 A | * | 11/2006 | |
| JP | 2012124731 A | | 6/2012 | |
| JP | 2014049775 A | | 3/2014 | |
| JP | 2014165574 A | | 9/2014 | |
| JP | 2016105548 A | | 6/2016 | |
| JP | 2018056689 A | * | 4/2018 | |
| WO | WO-2012/154388 A1 | | 11/2012 | |
| WO | WO-2017090611 A1 | | 6/2017 | |
| WO | 2017/159519 A1 | | 9/2017 | |
| WO | WO-2018/003095 A1 | | 1/2018 | |
| WO | WO-2019167797 A1 | * | 9/2019 | ............ H04J 14/023 |

OTHER PUBLICATIONS

Guo et al.; AMCC nonlinear baseband superimposition an extraction aided by proposed interference cancellation for WDM-PON used in 5G mobile fronthaul; Aug. 2022, Optics Express, pp. 1-12. (Year: 2022).*

ITU-T G.989.2 Recommendation, "40-Gigabit-capable-passive optical networks 2(NG PON2): Physical media dependent (PMD) layer specification", Feb. 2019.

Y. Luo et al., "Physical Layer Aspects of NG-PON2 Standards-Part 2: System Design and Technology Feasibility [Invited]", J.Opt. Com-mum. Netw., 8(1), pp. 43-52, Jan. 2016.

Masamichi Fujiwara et al., "Increasing Splitting Ratio of 10Gb/s-Class PONs by Using FW-DMF that Acts as Low Loss Splitter for Upstream and Conventional Splitter for Downstream", OFC, Tu2C, 2014.

Takuya Kanai et al., Photonic Gateway for All-Photonics Network, B-8-20, p. 141, Mar. 2021, IEICE.

Nakagawa Goji et al: "Development of Evaluation Platform of AMCC Superimposition on CPRI Signal Transmission for Mobile Fronthaul Network", 2017.

* cited by examiner

OPTICAL ACCESS SYSTEM AND CONTROL SIGNAL SUPERIMPOSITION METHOD

CROSS-REFERENCE TO RELATED APPLICATIONS

This application is a 371 U.S. National Phase of International Application No. PCT/JP2021/015849, filed on Apr. 19, 2021. The entire disclosure of the above application is incorporated herein by reference.

TECHNICAL FIELD

The present invention relates to an optical access system and a control signal superimposition method.

BACKGROUND ART

In the International Telecommunication Union Telecommunication Standardization sector (ITU-T) G. 989.2 Recommendation, a passive optical network (PON) system that performs wavelength multiplexing called point to point wavelength division multiplexing-passive optical network (PtP WDM-PON) is defined (see, for example, Non Patent Literature 1). In the PtP WDM-PON system, communication is performed using different wavelengths for each optical network unit (ONU) in an uplink direction that is a direction from an ONU to an optical line terminal (OLT) and in a downlink direction that is a direction from the OLT to the ONU.

As described in Non Patent Literature 1, in the PtP WDM-PON system, a management control signal called an auxiliary management and control channel (AMCC) is used as a signal for management and control used between the OLT and the ONU. The AMCC signal is a signal that is transmitted after being superimposed on a main signal after information to be transmitted is modulated by a predetermined method. The AMCC signal includes, for example, state information indicating a transmission/reception wavelength, transmission light intensity, temperature, and the like of an optical transceiver.

According to Non Patent Literature 1, there are two types of methods for superimposing the AMCC signals. A first method "baseband modulation" is a method of superimposing an AMCC signal on a main signal as a baseband signal on a transmitter (for example, ONU) side. In the superimposition method of "baseband modulation", the AMCC signal is separated by a filter such as a low-pass filter (LPF) on a receiver (for example, OLT) side.

A second method "low-frequency pilot tone" is a method of up-converting the AMCC signal to a certain carrier frequency and superimposing the AMCC signal on the main signal on the transmitter side. In the superimposition method of "low-frequency pilot tone", the AMCC signal is acquired by performing demodulation by signal processing or the like on the receiver side.

FIG. 14 illustrates a configuration of the PtP WDM system using "low-frequency pilot tone". As illustrated in FIG. 14, a conventional PtP WDM system 100 includes a subscriber device 200 and a subscriber device 300. The subscriber device 200 is a device on the transmitting side, and the subscriber device 300 is a device on the receiving side.

The subscriber device 200 includes an optical transmission unit 210. The optical transmission unit 210 includes a superimposing unit 220 and a laser diode (LD) 230. The subscriber device 200 superimposes a main signal and a control signal which are externally input in a state of an electrical signal, and converts the superimposed electrical signal into an optical signal by the LD 230. Thereafter, the optical transmission unit 210 outputs an optical signal to the optical fiber.

The subscriber device 300 includes an optical reception unit 310. The optical reception unit 310 includes a photo diode (PD) 320 and a low-pass filter (LPF) 330. The subscriber device 300 receives an optical signal transmitted through an optical fiber and converts the optical signal into an electrical signal by the PD 320. Thereafter, the subscriber device 300 separates an AMCC signal from a main signal at an electrical stage by using the LPF 330, and acquires the AMCC signal. In the subscriber device 200, by placing the main signal and the AMCC signal at different frequencies, the main signal and the AMCC signal can be physically treated as separate signals.

FIG. 15 illustrates a configuration of another PtP WDM system. As illustrated in FIG. 15, a conventional PtP WDM system 100a includes a subscriber device 200, a subscriber device 300, a power splitter 350, a monitoring circuit 400, and a management control unit 450. In FIG. 15, in addition to the configuration illustrated in FIG. 14, a power splitter 350 is provided as a monitoring port in the middle of the optical fiber, and a monitoring circuit 400 capable of receiving the optical signal split by the power splitter 350 and extracting the AMCC signal is provided.

The monitoring circuit 400 includes a PD 410 and an LPF 420. The PD 410 and the LPF 420 perform processing similar to that of the PD 320 and the LPF 330 included in the optical reception unit 310. With such a configuration, the AMCC signal can be received without passing through the subscriber device 300. The AMCC signal received by the monitoring circuit 400 is input to the management control unit 450, and for example, a transmission/reception wavelength and the like of the optical transceiver are managed.

Although FIG. 1S illustrates the configuration in which an optical signal is transmitted from the subscriber device 200 and the optical signal is received by the subscriber device 300, a configuration of bidirectional communication can be employed by further including the optical reception unit 310 in the subscriber device 200 and further including the optical transmission unit 210 in the subscriber device 300.

In FIG. 16, a configuration of a WDM system 100b in which a plurality of subscriber device pairs perform communication using different wavelengths will be described. The WDM system 100b includes a plurality of subscriber devices 200-1 to 200-3, a plurality of subscriber devices 300-1 to 300-3, a plurality of power splitters 350-1 to 350-3, a plurality of monitoring circuits 400-1 to 400-3, a management control unit 450, optical SWs 500-1 and 500-2, and a plurality of optical multiplexers/demultiplexer, 550-1 to 550-3, and 560-1 to 560-3.

In FIG. 16, in addition to the configuration illustrated in FIG. 15, a plurality of power splitters 350-1 to 350-3, a plurality of monitoring circuits 400-1 to 400-3, optical SWs 500-1 and 500-2, and a plurality of optical multiplexers/demultiplexers 550-1 to 550-3 and 560-1 to 560-3 are provided. The optical SWs 500-1 and 500-2 are provided between the subscriber devices-200-1 to 200-3 and the subscriber devices 300-1 to 300-3, and one optical transmission line can be selected from a plurality of optical transmission fines (in FIG. 16, three optical transmission lines). The optical multiplexers/demultiplexers 550-1 to 550-3 and 560-1 to 560-3 multiplex or demultiplex the optical signals output from the optical SWs 500-1 and 500-2.

The power splitters 350-1 to 350-3 and the monitoring circuits 400b-1 to 400b-3 are provided in the middle of each optical transmission line.

The subscriber devices 200-1 to 200-3 transmit optical signals having wavelengths λ1 to λ3, respectively, and the subscriber devices 300-1 to 300-3 transmit optical signals having wavelengths λ1' to λ3', respectively. In the optical SWs 500-1 and 500-2, a path between an input port and an output port is connected such that optical signals transmitted between the subscriber devices 200-1 to 200-3 and the subscriber devices 300-1 to 300-3 are output to designated optical transmission lines. The AMCC signal superimposed on the main signal by the subscriber devices 200-1 to 200-3 is acquired by the monitoring circuits 400b-1 to 400b-3.

FIG. 17 is a diagram illustrating a specific configuration of monitoring circuits 400b-1 to 400b-3. The monitoring circuit 400b includes a wavelength demultiplexing unit 430, a plurality of PDs 410-1 to 410-3, and a plurality of LPFs 420-1 to 420-3. Here, it is assumed that the PD 410-1 receives an optical signal output from a port corresponding to a wavelength λ1, the PD 410-2 receives an optical signal output from a port corresponding to a wavelength λ2, and the PD 410-3 receives an optical signal output from a port corresponding to a wavelength λ3. The wavelength demultiplexing unit 430 demultiplexes the input optical signal for each wavelength and outputs the optical signal from the corresponding port for each wavelength. The PDs 410-1 to 410-3 convert optical signals output from the wavelength demultiplexing unit 430 into electrical signals. The LPFs 420-1 to 420-3 separate AMCC signals from electrical signals. Thereby, the AMCC signal superimposed on the optical signal having each wavelength can be acquired. In FIG. 16, one connection line is illustrated as a path connecting each of the monitoring circuits 400b-1 to 400b-3 and the management control unit 450. However, as illustrated in FIG. 17, the output of one monitoring circuit 400b is one or more AMCC signals extracted from the optical signal demultiplexed for each wavelength. Therefore, the number of paths connecting each of the monitoring circuits 400b-1 to 400b-3 and the management control unit 450 is equal to the number of wavelengths.

Figure 18:
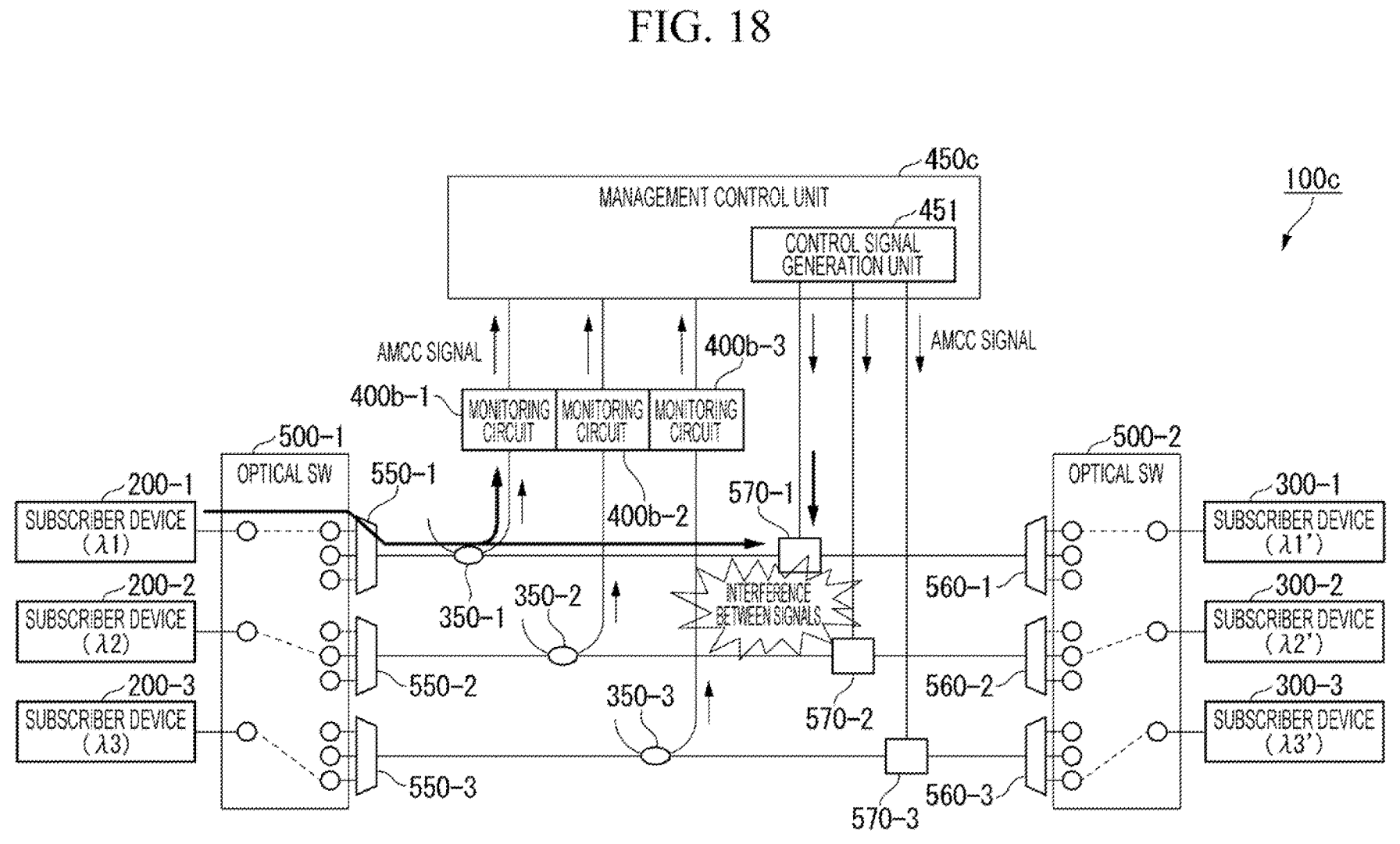

FIG. 18 illustrates a configuration of a system 100c that transmits an AMCC signal from a management control functional unit. The AMCC signal transmitted from the management control functional unit is transmitted to perform "communication termination notification (light emission stop instruction) to the connection destination device", "wavelength change by connection destination switching or path switching", "response to request to the subscriber device", and the like. The system 100c illustrated in FIG. 18 includes a plurality of subscriber devices 200-1 to 200-3, a plurality of subscriber devices 300-1 to 300-3, a plurality of power splitters 350-1 to 350-3, a plurality of monitoring circuits 400-1 to 400-3, a management control unit 450c, optical SWs 500-1 and 500-2, a plurality of optical multiplexers/demultiplexers 550-1 to 550-3, and 560-1 to 560-3, and a plurality of control signal superimposing units 570-1 to 570-3.

In FIG. 18, in the configuration illustrated in FIG. 16, a management control unit 450c is provided instead of the management control unit 450, and a plurality of control signal superimposing units 570-1 to 570-3 are newly provided. The management control unit 450c includes a control signal generation unit 451. The control signal generation unit 451 generates an AMCC signal, and transmits the generated AMCC signal to the corresponding control signal superimposing units 570-1 to 570-3 via electric lines. The control signal superimposing units 570-1 to 570-3 superimpose the AMCC signal transmitted from the management control unit 450c on the optical signal transmitted through the optical transmission line.

CITATION LIST

Non Patent Literature

Non Patent Literature 1: "ITU-T G.989.2 Recommendation, "40-Gigabit-capable-passive optical networks (NG-PON2): Physical media dependent (PMD) layer specification," February 2019.

Non Patent Literature 2: Y. Luo, H. Roberts, K. Grobe, M. Valvo, D. Nesset, K. A saka, H. Rohde, J. Smith, J. S. Wey, and F. Effenberger, "Physical Layer Aspects of NG-PON2 Standards-Part 2: System Design and Technology Feasibility," J. Opt. Com-mun. Netw., 8(1), pp. 43-52, January 2016.

SUMMARY OF INVENTION

Technical Problem

When the AMCC signal is superimposed on the main signal and transmitted from the subscriber device 200 by either the "baseband modulation" or the "low-frequency pilot tone", the main signal on which the AMCC signal is superimposed is transmitted not only to the monitoring circuit 400b side but also to the optical transmission line side by the power splitter 350. Therefore, when the AMCC signal is transmitted from the management control unit 450c to the control signal superimposing unit 570 as described above, the AMCC signal superimposed by the subscriber device 200 and the AMCC signal transmitted from the management control unit 450c interfere with each other, and the AMCC signal itself may not be superimposed on the main signal. Note that such a problem occurs not only in the AMCC signal but also in an out-of-band management control signal using a frequency band different from that of the main signal.

In view of the above circumstances, an object of the present invention is to provide a technique capable of suppressing interference with a main signal on which a management control signal is superimposed and further superimposing another management control signal on the main signal.

Solution to Problem

One aspect of the present invention is an optical access system that performs communication using an optical signal on which a management control signal used for management and control is superimposed, the optical access system including: a subscriber device on a transmitting side that generates an optical signal by superimposing the management control signal on a main signal and transmits the generated optical signal; a management control unit that outputs a management control signal which is superimposed on the optical signal transmitted by the subscriber device on the transmitting side and which has a frequency band different from a frequency of the management control signal superimposed on the optical signal; and a control signal superimposing unit that superimposes the management control signal output from the management control unit on the optical signal.

One aspect of the present invention is a control signal superimposition method in an optical access system that performs communication using an optical signal on which a management control signal used for management and control is superimposed, the control signal superimposition method including: generating, by a subscriber device on a transmitting side, an optical signal by superimposing the management control signal on a main signal and transmitting, by the subscriber device on the transmitting side, the generated optical signal; outputting a management control signal which is superimposed on the optical signal transmitted by the subscriber device on the transmitting side and which has a frequency band different from a frequency of the management control signal superimposed on the optical signal; and superimposing the output management control signal on the optical signal.

Advantageous Effects of Invention

According to the present invention, it is possible to suppress interference with a main signal on which a management control signal is superimposed and further superimpose another management control signal on the main signal.

BRIEF DESCRIPTION OF DRAWINGS

FIG. 1 is a diagram illustrating a configuration example of an optical access system according to a first embodiment.

FIG. 4 is a diagram illustrating a configuration of a monitoring circuit according to the first embodiment.

FIG. 10 is a diagram illustrating a configuration example of an optical access system according to a second embodiment.

FIG. 11 is a diagram illustrating a configuration example of an optical access system according to a third embodiment.

Figure 16:
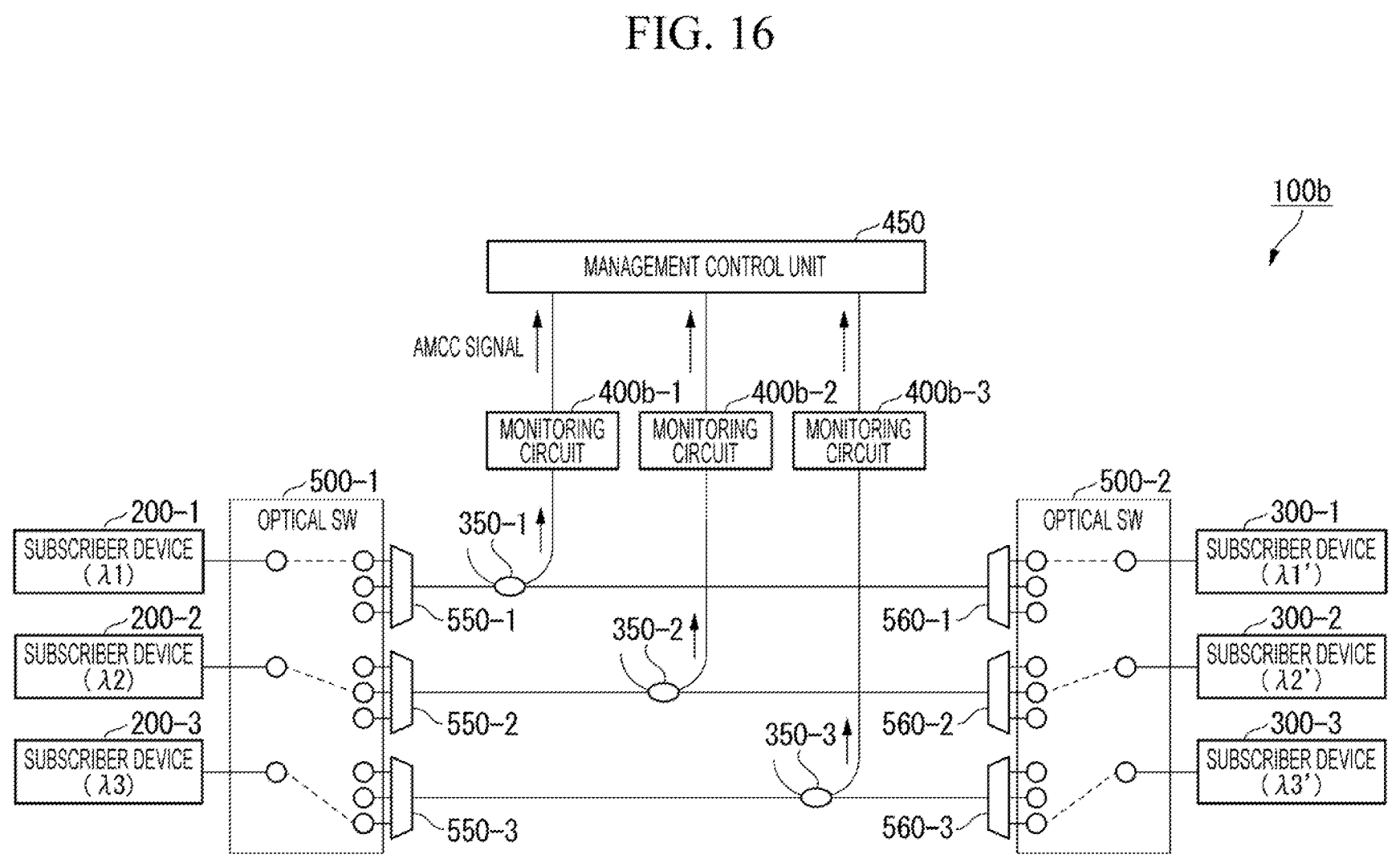

FIG. 16 is a diagram for describing a configuration of a WDM system in which a plurality of subscriber device pairs perform communication using different wavelengths.

FIG. 18 is a diagram illustrating a configuration of a system 100c that transmits an AMCC signal from a management control functional unit.

DESCRIPTION OF EMBODIMENTS

Figure 2:
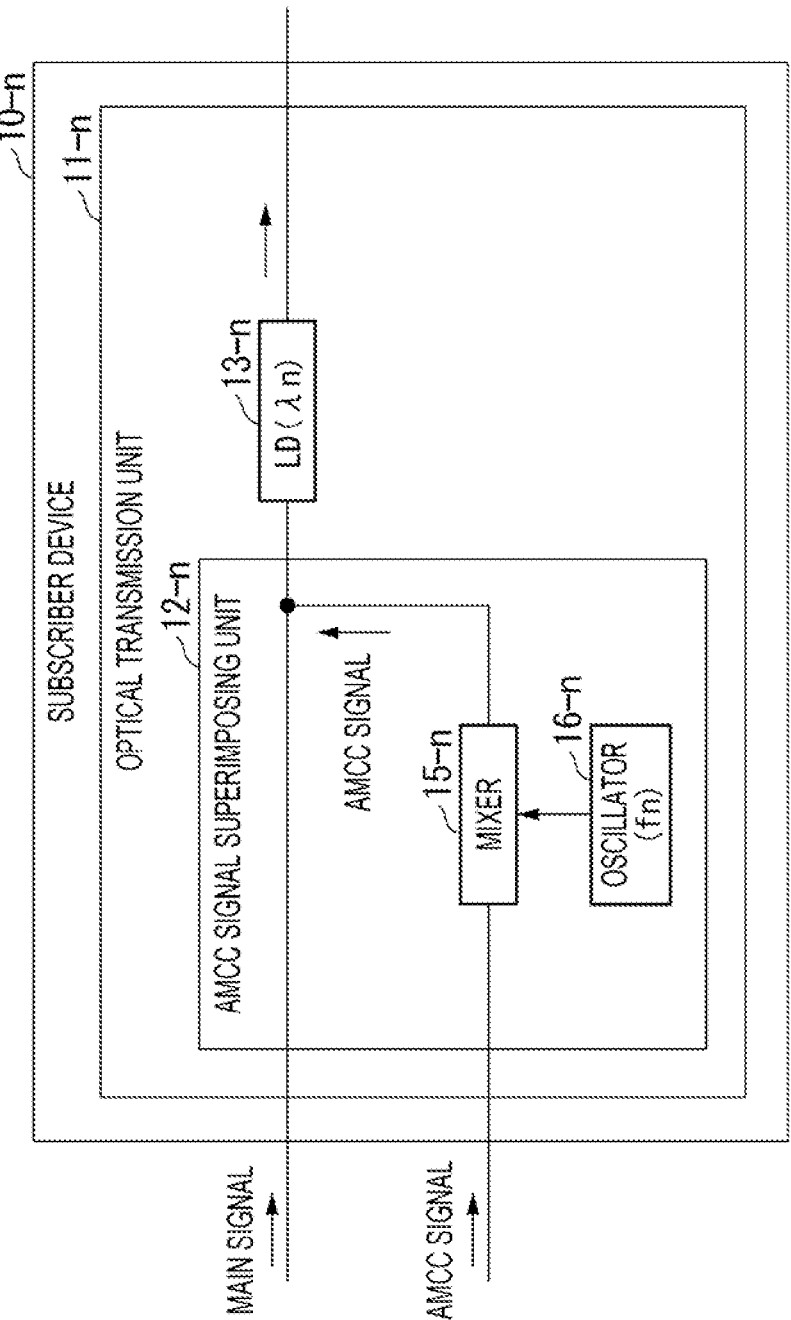
FIG. 2 is a diagram illustrating a configuration of a subscriber device on a transmitting side according to the first embodiment.

Hereinafter, an embodiment of the present invention will be described in detail with reference to the drawings.

First Embodiment

Figure 1:
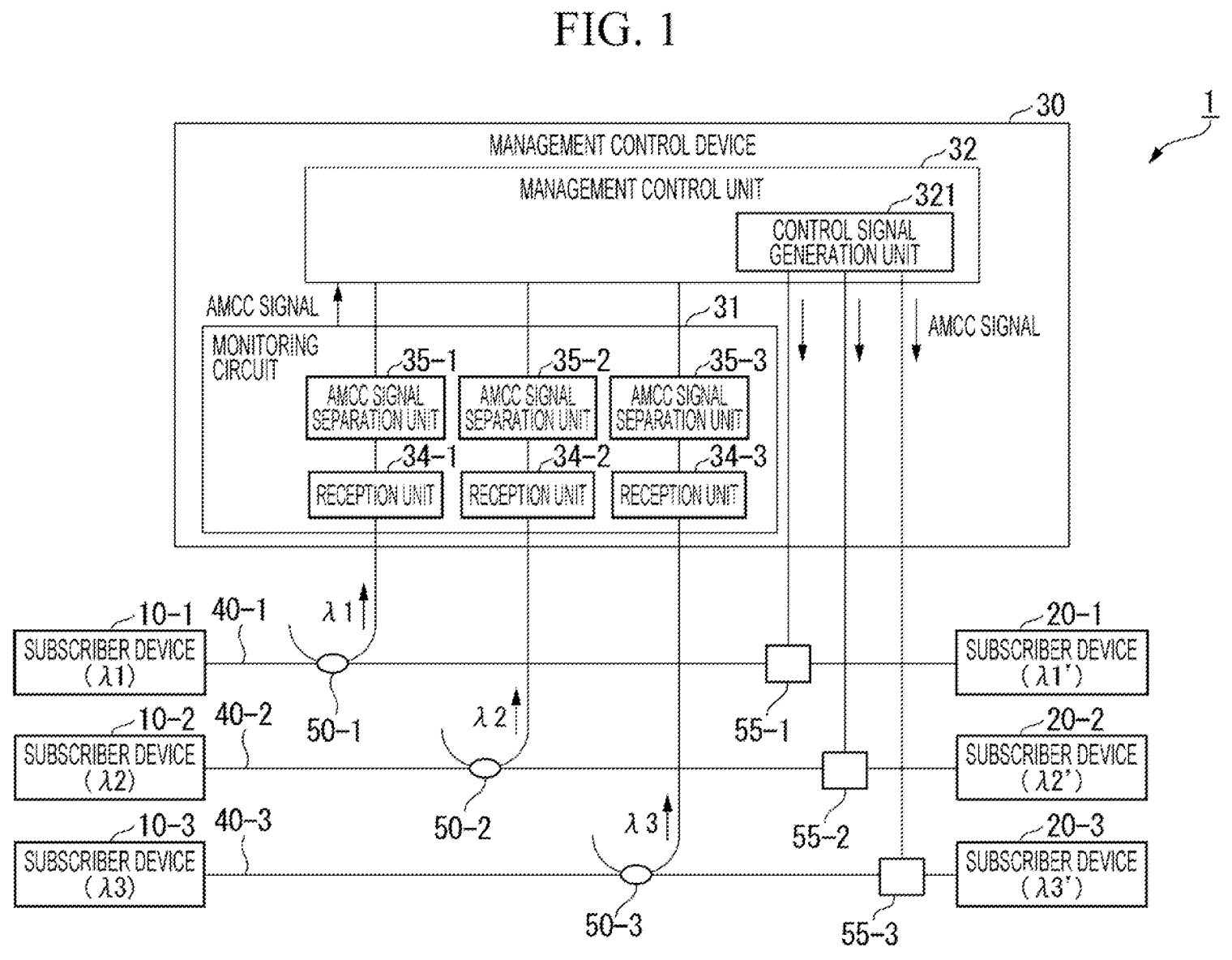

FIG. 1 is a diagram illustrating a configuration example of an optical access system 1 according to a first embodiment. The optical access system 1 includes a plurality of subscriber devices 10-1 to 10-3, a plurality of subscriber devices 20-1 to 20-3, a management control device 30, a plurality of power splitters 50-1 to 50-3, a plurality of control signal superimposing units (control signal superimposer) 55-1 to 55-3, and an optical coupler 60. Note that the power splitter 50 and the control signal superimposing unit 55 are provided for each optical transmission line 40.

In FIG. 1, the subscriber device 10-1 and the subscriber device 20-1 are connected via an optical transmission line 40-1. The subscriber device 10-2 and the subscriber device 20-2 are connected via an optical transmission line 40-2. The subscriber device 10-3 and the subscriber device 20-3 are connected via an optical transmission line 40-3. The optical transmission line 40 is, for example, an optical fiber.

In the following description, a case where the number of the subscriber devices 10 and 20 is three will be described as an example, but the number of the subscriber devices 10 and 20 may be one or more. A power splitter 50-$n$ is provided in an optical transmission line 40-$n$ (n is an integer of 1 or more). That is, the power splitter 50-$n$ is provided for each optical transmission line 40-$n$.

A subscriber device 10-$n$ transmits an optical signal having a wavelength $\lambda$n to the optical transmission line 40-$n$. For example, the subscriber device 10-$n$ transmits, to the optical transmission line 40-$n$, an optical signal having a wavelength $\lambda$n obtained by superimposing an AMCC signal on the main signal. That is, the subscriber device 10-$n$ transmits optical signals having different wavelengths to the optical transmission line 40-$n$.

The method for superimposing the AMCC signal may be either "baseband modulation" or "low-frequency pilot tone". The configuration of the subscriber device 10-$n$ varies depending on the manner of superimposing the AMCC signal, but in the first embodiment, it is assumed that the subscriber device 10-$n$ superimposes the AMCC signal on the main signal by the "low-frequency pilot tone" method.

In the following description, it is assumed that the subscriber device 10-1 transmits an optical signal having a wavelength $\lambda$1 obtained by superimposing an AMCC signal of a frequency f1 on the main signal to the optical transmission line 40-1, the subscriber device 10-2 transmits an optical signal having a wavelength $\lambda$2 obtained by superimposing an AMCC signal of a frequency f2 on the main signal to the optical transmission line 40-2, and the subscriber device 10-3 transmits an optical signal having a wavelength $\lambda$3 obtained by superimposing an AMCC signal of a frequency f3 on the main signal to the optical transmission line 40-3.

A subscriber device 20-$n$ receives an optical signal transmitted from the subscriber device 10-$n$. For example, the subscriber device 20-$n$ receives an optical signal having a wavelength λn in which an AMCC signal of a frequency fn is superimposed on the main signal via the optical transmission line 40-*n*. The subscriber device 20-*n* has a configuration capable of separating the superimposed AMCC signals by the superimposition method of the subscriber device 10-*n*. The subscriber device 20-*n* may transmit an optical signal having a wavelength (for example, a wavelength λn') different from that of the subscriber device 10-*n*.

The management control device 30 monitors the AMCC signal and performs control based on the AMCC signal. The management control device 30 includes a monitoring circuit (monitor) 31 and a management control unit (management controller) 32. The monitoring circuit 31 includes a plurality of reception units (receiver) 34-1 to 34-3, and a plurality of AMCC signal separation units 35-1 to 35-3. Note that the number of the reception units 34-1 to 34-3 and the number of the AMCC signal separation units 35-1 to 35-3 may be the same as the number of the optical transmission lines 40. Accordingly, the optical signal transmitted through each optical transmission line 40 can be processed by each reception unit 34.

The reception unit 34-*n* converts the optical signal output from the power splitter 50-*n* into an electrical signal. For example, the reception unit 34-1 is connected to the power splitter 50-1, and converts the optical signal output from the power splitter 50-1 into an electrical signal. For example, the reception unit 34-2 is connected to the power splitter 50-2, and converts the optical signal output from the power splitter 50-2 into an electrical signal. For example, the reception unit 34-3 is connected to the power splitter 50-3, and converts the optical signal output from the power splitter 50-3 into an electrical signal. The reception unit 34-*n* is configured using a PD.

An AMCC signal separation unit 35-*n* separates an AMCC signal from the electrical signal converted by the reception unit 34-*n*. For example, the AMCC signal separation unit 35-*n* separates a plurality of AMCC signals having different frequencies from the electrical signal converted by the reception unit 34-*n*. A specific configuration of the AMCC signal separation unit 35-*n* will be described with reference to FIG. 4.

The management control unit 32 receives the AMCC signal separated by the AMCC signal separation unit 35-*n*, and manages transmission/reception wavelengths and the like of the subscriber devices 10-*n* and 20-*n* on the basis of the received AMCC signal. The management control unit 32 includes a control signal generation unit 321. The control signal generation unit 321 generates an AMCC signal for a destination to be controlled. The AMCC signal generated by the control signal generation unit 321 includes information such as "communication termination notification (light emission stop instruction) to the connection destination device", "wavelength change by connection destination switching or path switching", "response to request to the subscriber device", and the like.

The control signal generation unit 321 is connected to control signal superimposing units 55-1 to 55-3 via electric lines. The control signal generation unit 321 transmits the generated AMCC signal to the control signal superimposing units 55-1 to 55-3. Note that the control signal generation unit 321 may hold information indicating which optical transmission line 40 the subscriber devices 10 and 20 are connected to and specify the optical transmission line 40 to which the destination subscriber devices 10 and 20 are connected. In this case, the control signal generation unit 321 transmits the AMCC signal to the control signal superimposing units 55-1 to 55-3 provided on the specified optical transmission line 40.

In addition to the AMCC signal generated by the control signal generation unit 321, the optical signal transmitted through the optical transmission line 40 is input to the control signal superimposing units 55-1 to 55-3. In the optical signal transmitted through the optical transmission line 40, the AMCC signal is superimposed on the main signal in the subscriber device 10. Therefore, interference occurs between the frequency of the AMCC signal generated by the control signal generation unit 321 input to the control signal superimposing units 55-1 to 55-3 and the frequency of the AMCC signal superimposed on the optical signal transmitted through the optical transmission line 40.

Therefore, the control signal generation unit 321 according to the present invention generates an AMCC signal that can be superimposed by a superimposition method different from the superimposition method used by the subscriber device 10 in the control signal superimposing units 55-1 to 55-3. That is, the control signal generation unit 321 generates an AMCC signal having a frequency band different from the frequency of the AMCC signal superimposed by the subscriber device 10 as an AMCC signal that can be superimposed by the control signal superimposing units 55-1 to 55-3. For example, when the subscriber device 10 superimposes the AMCC signal on the main signal by the "low-frequency pilot tone" method, the control signal generation unit 321 generates an AMCC signal that can be superimposed on the AMCC signal on the main signal by the "baseband modulation" method in the control signal superimposing units 55-1 to 55-3.

In order for the control signal generation unit 321 to generate the AMCC signal as described above, it is necessary to notify the management control unit 32 of the superimposition method used by the subscriber device 10. As a method of notifying the management control unit 32 of the superimposition method used by the subscriber device 10, the superimposition method of the AMCC signal may be notified to the management control unit 32 at the timing when the subscriber device 10 is connected (the timing of the initial connection), or the management control unit 32 may determine the superimposition method on the subscriber device 10 side as either "baseband modulation" or "low-frequency pilot tone" in advance.

In the present description, since the subscriber device 10-*n* superimposes the AMCC signal on the main signal by the "low-frequency pilot tone" method, the control signal generation unit 321 generates a baseband AMCC signal. Note that the timing at which the control signal generation unit 321 generates the AMCC signal may be any timing as long as it is a timing at which transmission of the AMCC signal becomes necessary.

The power splitter 50-*n* splits an optical signal transmitted through the optical transmission line 40-*n* into a first path toward the management control device 30 and a second path toward the subscriber device 20-*n*. The optical signal having the wavelength λn split by the power splitter 50-*n* is input to the management control device 30 and the control signal superimposing units 55-1 to 55-3.

The control signal superimposing units 55-1 to 55-3 superimpose the AMCC signal generated by the control signal generation unit 321 on the optical signal transmitted through the optical transmission line 40. The control signal superimposing units 55-1 to 55-3 superimpose the AMCC signal generated by the control signal generation unit 321 on the optical signal transmitted through the optical transmission line 40 by a superimposition method different from the superimposition method of the AMCC signal used by the subscriber device 10.

FIG. 2 is a diagram illustrating a configuration of the subscriber device 10-*n* according to the first embodiment. The configuration illustrated in FIG. 2 is a configuration in a case where the AMCC signal is superimposed on the main signal at the electrical stage. The subscriber device 10-*n* includes an optical transmission unit 11-*n*. Note that, in FIG. 2, only the optical transmission unit 11-*n* is illustrated in order to describe a characteristic configuration of the subscriber device 10-*n*. The optical transmission unit 11-*n* includes an AMCC signal superimposing unit 12-*n* and an LD 13-*n*. The AMCC signal superimposing unit 12-*n* includes a mixer 15-*n* and an oscillator 16-*n* (LO).

The AMCC signal superimposing unit 12-*n* up-converts the AMCC signal, which is a low frequency signal input from the outside, to the frequency fn using the mixer 15-*n* and the oscillator 16-*n*. The AMCC signal superimposing unit 12-*n* superimposes the AMCC signal up-converted to the frequency fn on the main signal input from the outside at the electrical stage.

The LD 13-*n* outputs light having a wavelength λn. The LD 13-*n* converts the electrical signal of the main signal on which the AMCC signal is superimposed in the electrical stage into an optical signal having a wavelength λn and outputs the optical signal.

Figure 3:
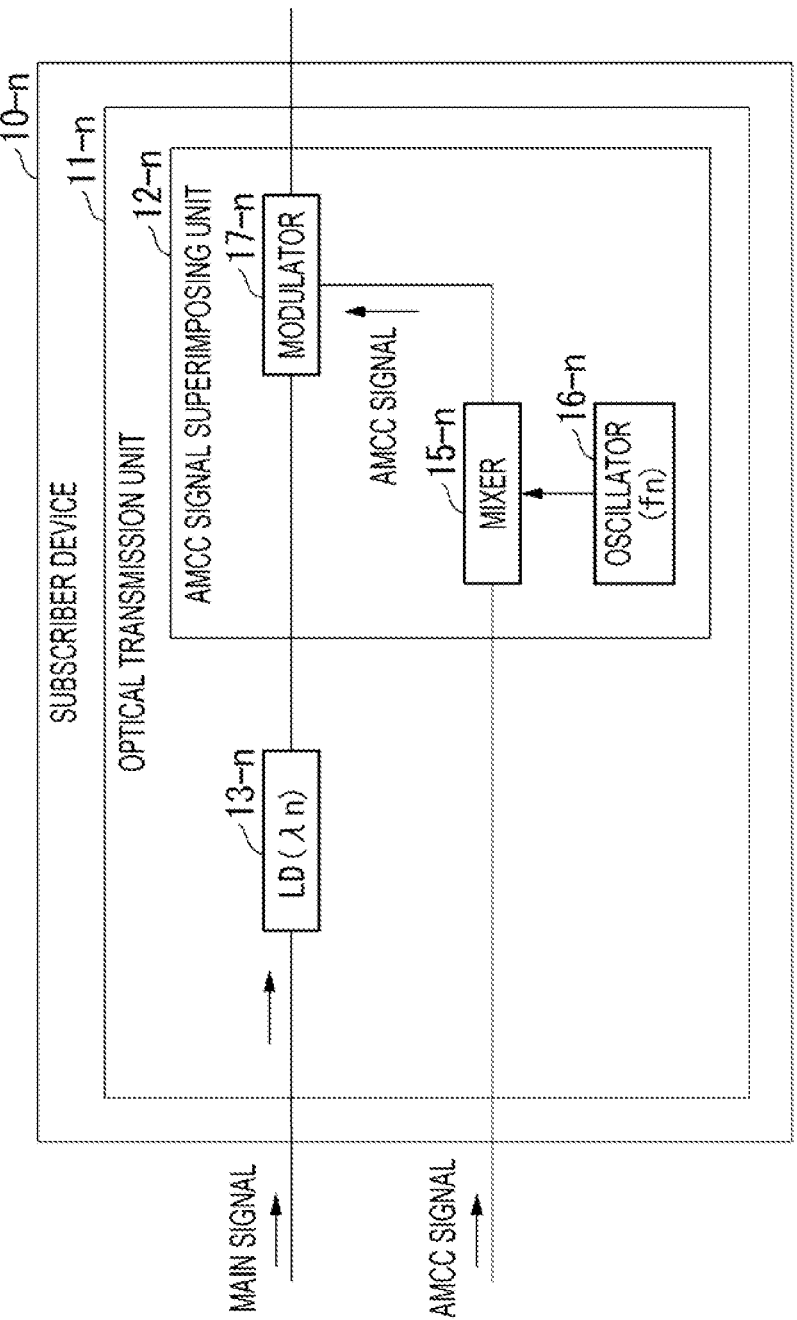
FIG. 3 is a diagram illustrating another configuration of the subscriber device on the transmitting side according to the first embodiment.

FIG. 3 is a diagram illustrating another configuration of the subscriber device 10-*n* according to the first embodiment. The configuration illustrated in FIG. 3 is a configuration in a case where the AMCC signal is superimposed on the main signal at the optical stage. The subscriber device 10-*n* includes an optical transmission unit 11-*n*. Note that, in FIG. 3, only the optical transmission unit 11-*n* is illustrated in order to describe a characteristic configuration of the subscriber device 10-*n*. The optical transmission unit 11-*n* includes an AMCC signal superimposing unit 12-*n* and an LD 13-*n*. The AMCC signal superimposing unit 12-*n* includes a mixer 15-*n*, an oscillator 16-*n*, and a modulator 17-*n*.

The subscriber device 10-*n* converts the electrical signal of the main signal input from the outside into an optical signal by the LD 13-*n*. The AMCC signal superimposing unit 12-*n* up-converts the AMCC signal, which is a low frequency signal input from the outside, to the frequency fn using the mixer 15-*n* and the oscillator 16-*n*. The AMCC signal superimposing unit 12-*n* superimposes the AMCC signal up-converted to the frequency fn on the optical signal at the optical stage using the modulator 17-*n*. The modulator 17-*n* used here may be any modulator as long as it is an optical modulator that changes an intensity component of light. For example, any one of a variable optical attenuator (VOA), a semiconductor optical amplifier (SOA), and an LN modulator may be used as the modulator 17-*n*.

Figure 4:
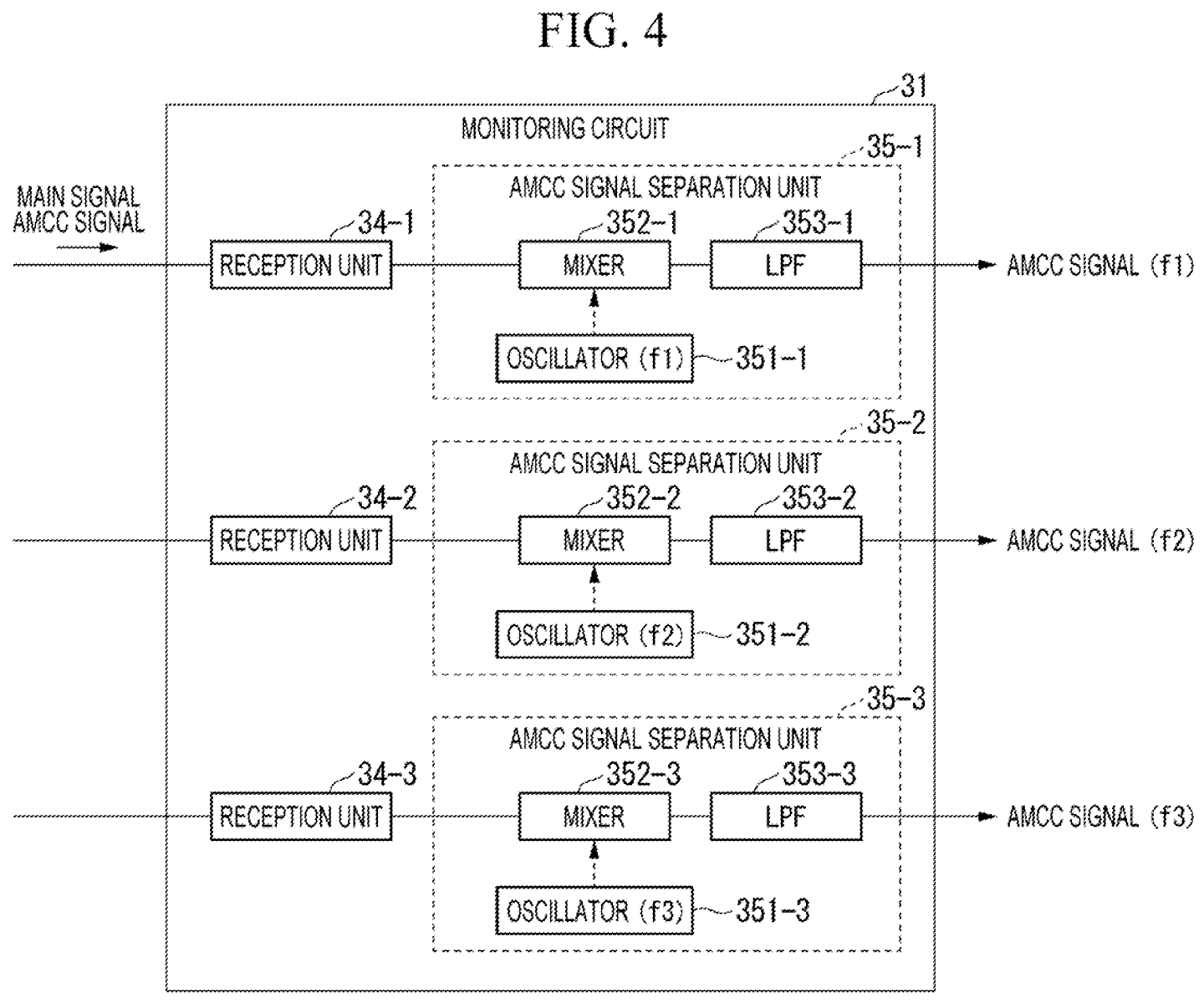

FIG. 4 is a diagram illustrating a configuration of the monitoring circuit 31 according to the first embodiment. The monitoring circuit 31 includes reception units 34-1 to 34-3 and AMCC signal separation units 35-1 to 35-3. The reception unit 34-*n* converts the input optical signal into an electrical signal. The reception unit 34-*n* is, for example, a PD.

The AMCC signal separation unit 35-*n* includes the same number of oscillators 351-*n*, mixers 352-*n*, and LPFs 353-*n* as the number of types of frequencies of the input AMCC signal. FIG. 4 illustrates three AMCC signal separation units 35-1 to 35-3. The AMCC signal separation unit 35-*n* down-converts the input electrical signal using the mixer 352-*n* and the oscillator 351-*n* set to the frequency fn. Thereafter, the AMCC signal separation unit 35-*n* extracts the AMCC signal from the down-converted electrical signal by the LPF 353-*n*.

In the configuration illustrated in FIG. 4, the AMCC signal separation unit 35-1 is connected to the reception unit 34-1, the AMCC signal separation unit 35-2 is connected to the reception unit 34-2, and the AMCC signal separation unit 35-3 is connected to the reception unit 34-3. For example, the AMCC signal separation unit 35-1 down-converts the input electrical signal using the mixer 352-1 and the oscillator 351-1 set to the frequency f1. Thereafter, the AMCC signal separation unit 35-1 extracts the AMCC signal having the frequency f1 from the down-converted electrical signal by the LPF 353-1.

Figure 5:
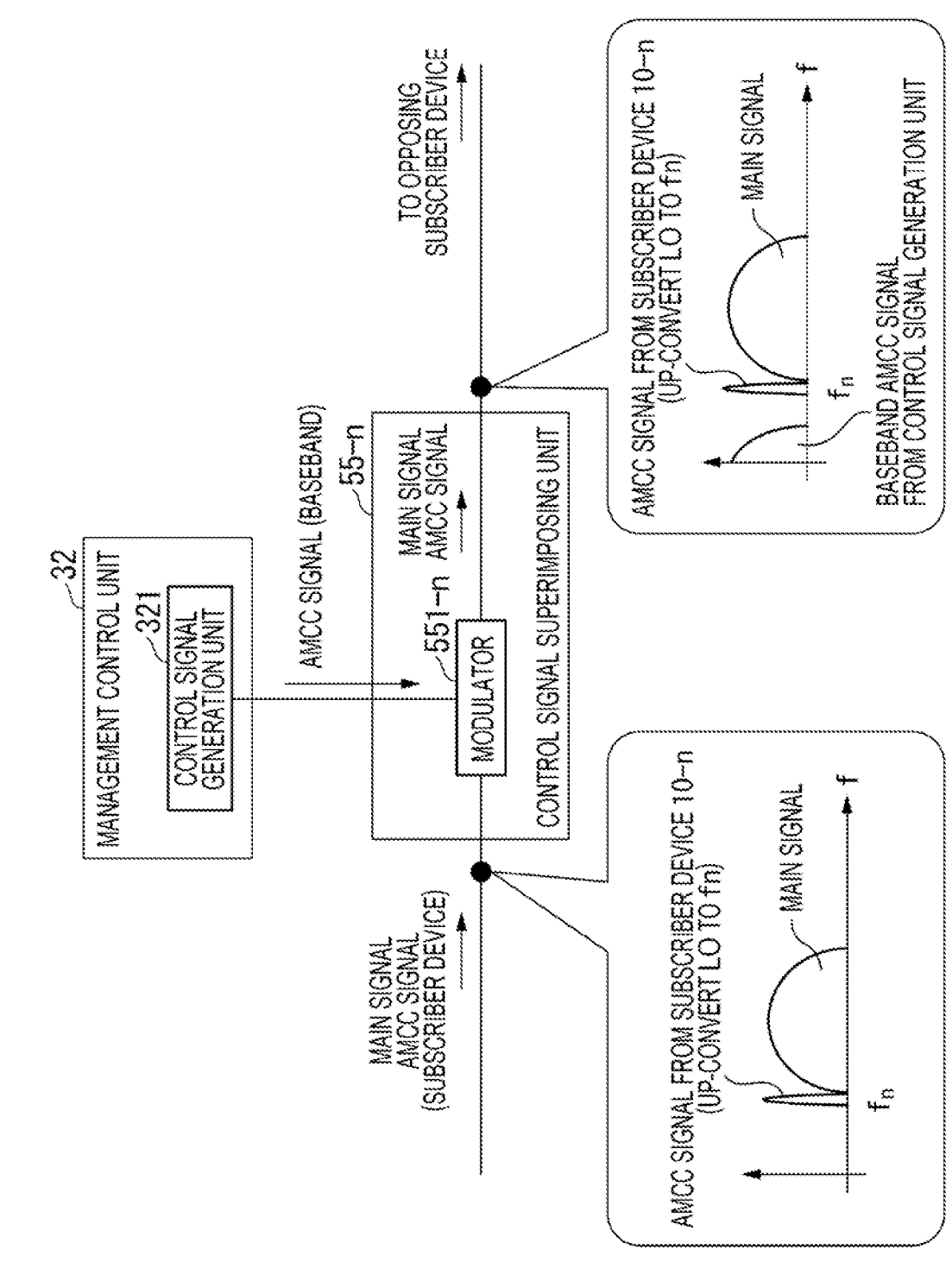
FIG. 5 is a diagram illustrating a configuration of a control signal superimposing unit according to the first embodiment.

FIG. 5 is a diagram illustrating a configuration of a control signal superimposing unit 55-*n* according to the first embodiment. In the example illustrated in FIG. 5, the control signal superimposing unit 55-*n* includes a modulator 551-*n*. The control signal superimposing unit 55-*n* superimposes the baseband AMCC signal generated by the control signal generation unit 321 on the optical signal at the optical stage using the modulator 551-*n*. Similarly to the modulator 17-*n*, the modulator 551-*n* may be any modulator as long as it is an optical modulator that changes an intensity component of light. For example, any one of a VOA, an SOA, and an LN modulator may be used as the modulator 551-*n*. As illustrated in FIG. 5, the optical signal input to the control signal superimposing unit 55-*n* includes the AMCC signal up-converted at a carrier frequency fn so as not to overlap the frequency component of the main signal in the subscriber device 10.

On the other hand, the AMCC signal generated by the control signal generation unit 321 is superimposed on the optical signal output from the control signal superimposing unit 55-*n* at a position not overlapping the main signal and the AMCC signal up-converted by the subscriber device 10 in the frequency domain. In this way, since the frequency of the AMCC signal generated by the control signal generation unit 321 is different from the AMCC signal included in the optical signal, interference can be suppressed and superimposition can be performed.

Figure 6:
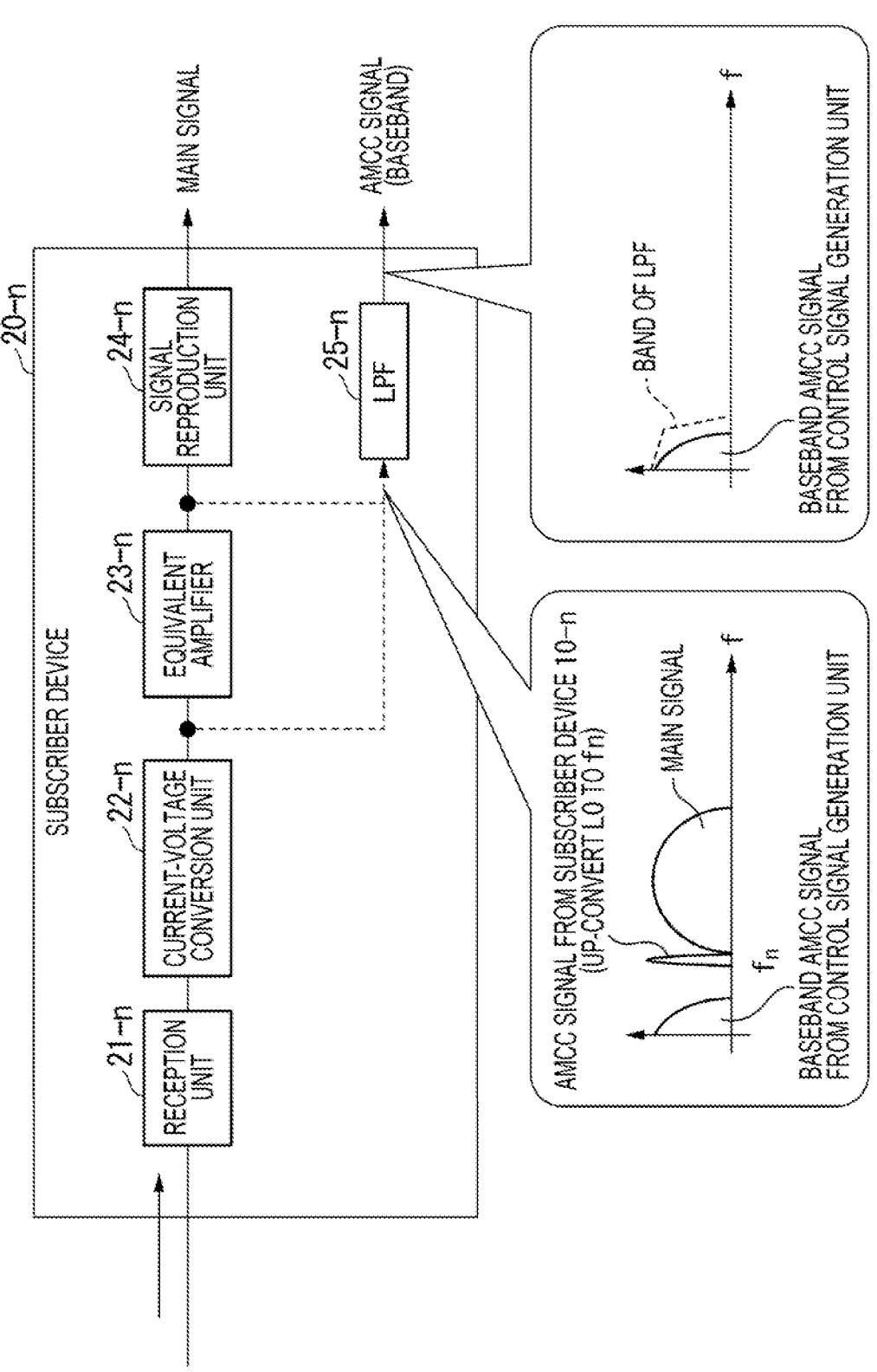
FIG. 6 is a diagram illustrating a configuration of a subscriber device on a receiving side according to the first embodiment.

FIG. 6 is a diagram illustrating a configuration of the subscriber device 20-*n* facing the subscriber device 10-*n* according to the first embodiment. Here, the subscriber device 20-*n* facing the subscriber device 10-*n* is the subscriber device on the receiving side. The subscriber device 20-*n* includes a reception unit 21-*n*, a current-voltage conversion unit 22-*n*, an equivalent amplifier 23-*n*, a signal reproduction unit 24-*n*, and an LPF 25-*n*. The reception unit 21-*n* converts the input optical signal into an electrical signal.

The current-voltage conversion unit 22-*n* converts a current signal into a voltage. For example, the current-voltage conversion unit 22-*n* is a trans impedance amplifier. The equivalent amplifier 23-*n* amplifies the voltage signal. The signal reproduction unit 24-*n* extracts Clock from the voltage signal, and identifies and reproduces the signal according to the Clock. The signal reproduction unit 24-*n* functions as, for example, a clock and data recovery (CDR). The LPF 25-*n* extracts the AMCC signal superimposed by the control signal superimposing unit 55. For example, the LPF 25-*n* is an LPF having a band near the baseband.

As illustrated in FIG. 6, an optical signal in which the main signal transmitted from the subscriber device 10, the AMCC signal of the frequency fn up-converted by the oscillator 16 of the subscriber device 10, and the baseband AMCC signal transmitted from the management control unit 32 are superimposed is input to the LPF 25-n. The LPF 25-n may receive the output from either the current-voltage conversion unit 22-n or the equivalent amplifier 23-n. In this way, by using the LPF 25-n having a band near the baseband, the AMCC signal transmitted from the management control unit 32 can be extracted.

Figure 7:
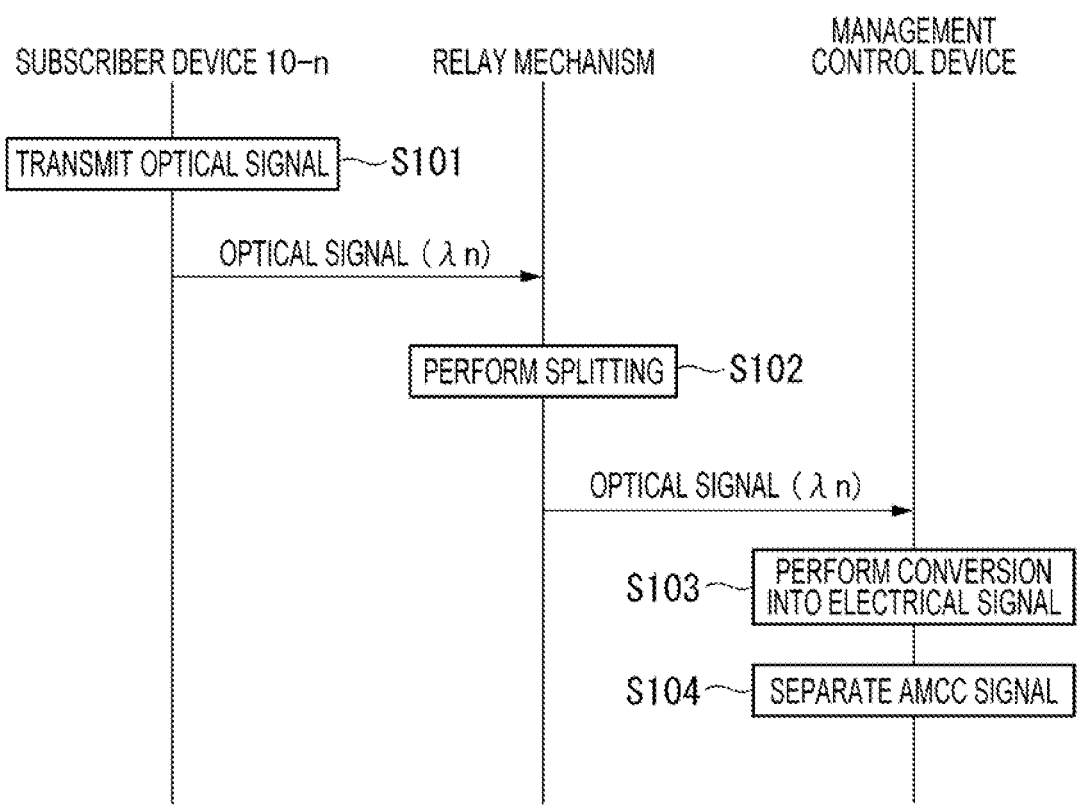
FIG. 7 is a sequence diagram illustrating a flow of processing of the optical access system according to the first embodiment.

FIG. 7 is a sequence diagram illustrating a flow of processing of the optical access system 1 according to the first embodiment. In FIG. 7, the power splitters 50-1 to 50-3 will be described as relay mechanisms. In FIG. 7, processing of extracting the AMCC signal by the management control unit 32 will be described.

The subscriber device 10-n transmits an optical signal having a wavelength $\lambda n$ to the optical transmission line 40-n (step S101). For example, the subscriber device 10-1 transmits an optical signal having a wavelength $\lambda 1$ to the optical transmission line 40-1. Specifically, the subscriber device 10-1 transmits, to the optical transmission line 40-1, an optical signal having a wavelength $\lambda 1$ generated by superimposing the AMCC signal up-converted to the frequency f1 on the main signal. The optical signal transmitted from the subscriber device 10-1 is input to the power splitter 50-1 via the optical transmission line 40-1. Similar processing is performed in the subscriber devices 10-2 and 10-3.

The power splitter 50-n splits the input optical signal having the wavelength $\lambda n$ into a first path and a second path (step S102). The optical signal having the wavelength $\lambda n$ split into the first path is input to the management control device 30, and the optical signal having the wavelength $\lambda n$ split into the second path is input to the control signal superimposing unit 55-n.

The reception unit 34-1 of the monitoring circuit 31 is connected to the first path through which the power splitter 50-1 outputs the optical signal. Therefore, the optical signal having the wavelength $\lambda 1$ split into the first path by the power splitter 50-1 is input to the reception unit 34-1 of the monitoring circuit 31. Similarly, the reception units 34-2 and 34-3 of the monitoring circuit 31 are connected to the first path through which the power splitters 50-2 and 50-3 output optical signals. Therefore, the optical signals having the wavelengths $\lambda 2$ and $\lambda 3$ split into the first paths by the power splitters 50-2 and 50-3 are input to the reception units 34-2 and 34-3 of the monitoring circuit 31, respectively.

The reception unit 34-n of the monitoring circuit 31 converts the input optical signal into an electrical signal (step S103). The reception unit 34-n outputs the converted electrical signal to the AMCC signal separation unit 35-n. The AMCC signal separation unit 35-n separates the AMCC signal from the input electrical signal (step S104).

Specifically, the electrical signal input to the AMCC signal separation unit 35-n is input to the mixer 352-n. The electrical signal input to the mixer 352-1 is down-converted using the oscillator 351-1 set to the frequency f1. The down-converted electrical signal is input to the LPF 353-1, and the AMCC signal having the frequency f1 is extracted.

The electrical signal input to the mixer 352-2 is down-converted using the oscillator 351-2 set to the frequency f2. The down-converted electrical signal is input to the LPF 353-2, and the AMCC signal having the frequency f2 is extracted.

The electrical signal input to the mixer 352-3 is down-converted using the oscillator 351-3 set to the frequency f3. The down-converted electrical signal is input to the LPF 353-3, and the AMCC signal having the frequency f3 is extracted.

Figure 8:
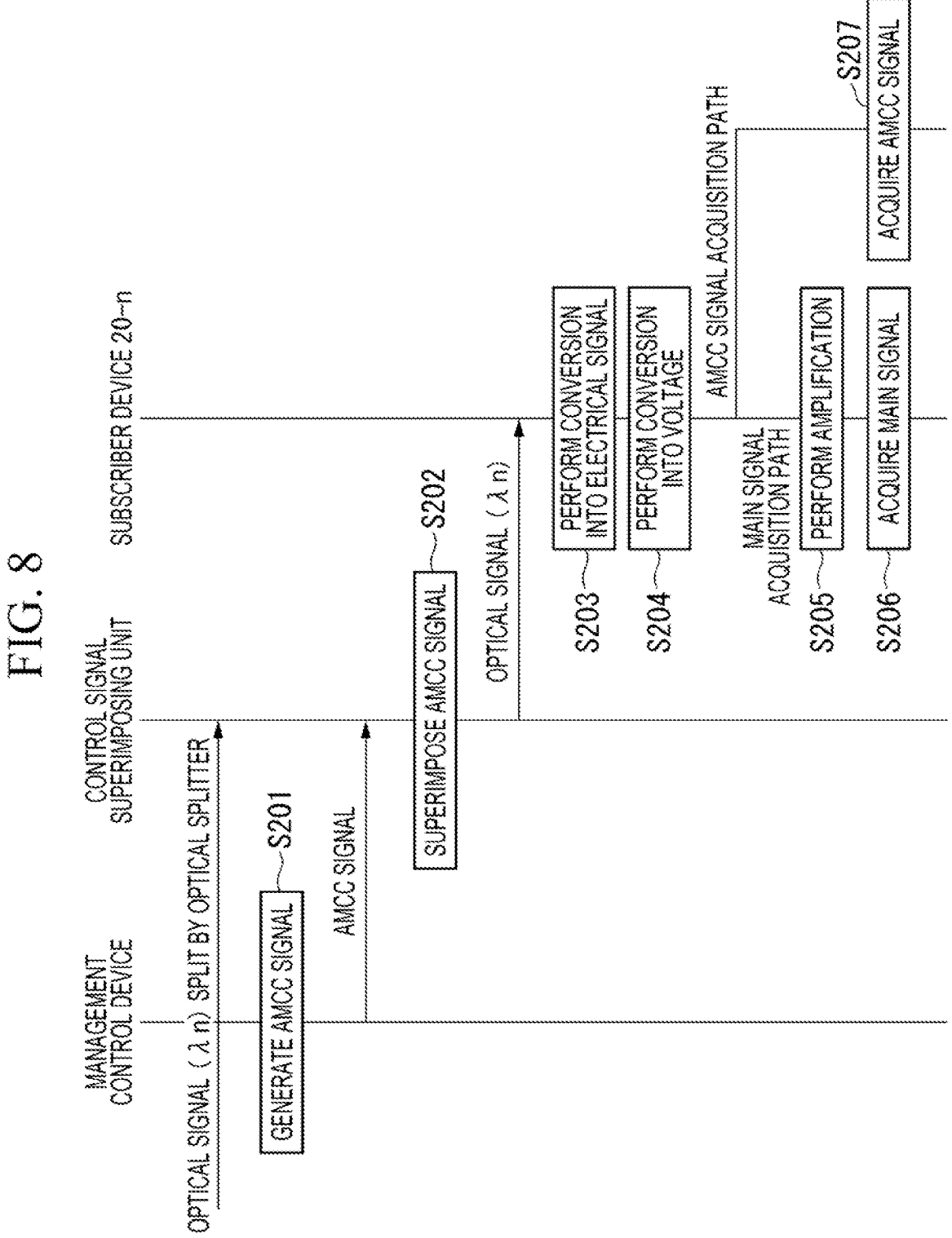
FIG. 8 is a sequence diagram illustrating a flow of processing of the optical access system according to the first embodiment.

FIG. 8 is a sequence diagram illustrating a flow of processing of the optical access system 1 according to the first embodiment. In FIG. 8, processing of extracting the AMCC signal in the subscriber device 20-n will be described.

The optical signal having the wavelength $\lambda n$ split by the power splitter 50-n is input to the control signal superimposing unit 55-n. The control signal generation unit 321 of the management control unit 32 generates an AMCC signal (step S201). For example, the control signal generation unit 321 generates a baseband AMCC signal. The control signal generation unit 321 outputs the generated baseband AMCC signal to the control signal superimposing unit 55-n via an electric line. Note that, in a case where the generated baseband AMCC signal is an AMCC signal addressed to the subscriber device 20-1, the control signal generation unit 321 outputs the generated baseband AMCC signal to the control signal superimposing unit 55-1. Here, it is assumed that the baseband AMCC signal is an AMCC signal addressed to the subscriber device 20-1.

The control signal superimposing unit 55-1 superimposes the baseband AMCC signal on the optical signal transmitted through the optical transmission line 40-1 using the modulator 551 (step S202). The control signal superimposing unit 55-1 outputs the superimposed optical signal to the optical transmission line 40-1. The optical signal output to the optical transmission line 40-1 is input to the subscriber device 20-1. The reception unit 21-1 of the subscriber device 20-1 converts the input optical signal into an electrical signal (step S203). The reception unit 21-1 outputs the electrical signal to the current-voltage conversion unit 22-1.

The current-voltage conversion unit 22-1 converts the current signal output from the reception unit 21-1 into a voltage signal (step S204). The current-voltage conversion unit 22-1 outputs the voltage signal to the equivalent amplifier 23-1 and the LPF 25-1. In FIG. 8, a configuration in which the output of the current-voltage conversion unit 22-1 is partially tapped and output to the LPF 25-1 in order to acquire the AMCC signal will be described. In this case, the optical signal output from the current-voltage conversion unit 22-1 flows through a main signal acquisition path and an AMCC signal acquisition path. The main signal acquisition path is a path via the signal reproduction unit 24-1, and the AMCC signal acquisition path is a path via the LPF 25-1. The equivalent amplifier 23-1 amplifies the voltage signal output from the current-voltage conversion unit 22-1 (step S205). The equivalent amplifier 23-1 outputs the amplified voltage signal to the signal reproduction unit 24-1.

The signal reproduction unit 24-1 extracts Clock from the amplified voltage signal output from the equivalent amplifier 23-1, and identifies and reproduces the main signal according to the extracted Clock (step S206). A voltage signal obtained by partially tapping the output of the current-voltage conversion unit 22-1 is input to the LPF 25-1. The LPF 25-1 extracts the superimposed AMCC signal from the management control unit 32 in the input voltage signal (step S207).

Note that, although the configuration in which the output of the current-voltage conversion unit 22-1 is partially tapped and output to the LPF 25-1 has been described above, a part of the output of the equivalent amplifier 23-1 may be tapped and output to the LPF 25-1. In this way, the subscriber device 20-1 extracts the AMCC signal by using the signal before being input to the signal reproduction unit 24-1. The same applies to the other subscriber devices 20-n.

According to the optical access system 1 configured as described above, the control signal superimposing unit 55-n superimposes the AMCC signal in the frequency band different from the frequency of the AMCC signal superimposed on the optical signal transmitted from the subscriber device 10. Accordingly, the newly superimposed AMCC signal and the already superimposed AMCC signal do not interfere with each other. Therefore, it is possible to suppress interference with the main signal on which the AMCC signal is superimposed and further superimpose another AMCC signal on the main signal.

In the optical access system 1, the AMCC signal transmitted from the management control unit 32 is superimposed on the optical signal by a superimposition method different from the superimposition method of the AMCC signal used by the subscriber device 10. Accordingly, the frequency of the AMCC signal transmitted from the management control unit 32 to be newly superimposed becomes a frequency different from the frequency of the AMCC signal already superimposed on the main signal. Therefore, interference can be suppressed. Therefore, it is possible to suppress interference with the main signal on which the AMCC signal is superimposed and further superimpose another AMCC signal on the main signal.

Modification of First Embodiment

Figure 9:
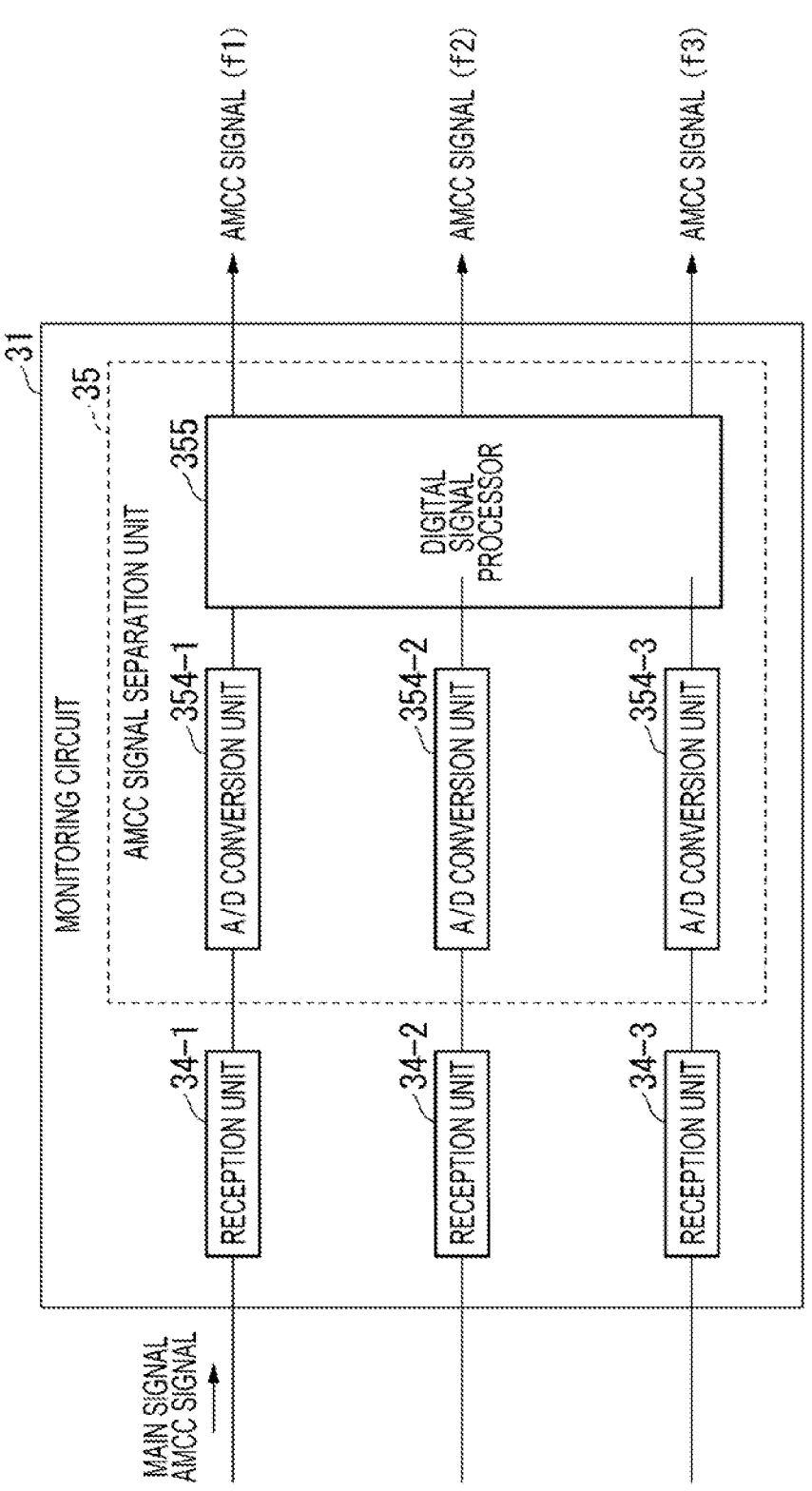
FIG. 9 is a diagram illustrating another configuration of the monitoring circuit according to the first embodiment.

The configuration of the monitoring circuit 31 illustrated in FIG. 4 can also be configured using a digital signal processor (DSP) as illustrated in FIG. 9. FIG. 9 is a diagram illustrating another configuration of the monitoring circuit 31 according to the first embodiment. The monitoring circuit 31 illustrated in FIG. 9 includes a plurality of reception units 34-1 to 34-3 and an AMCC signal separation unit 35.

The AMCC signal separation unit 35 includes a plurality of analog digital (A/D) conversion units 354-1 to 354-3 and a digital signal processor 355. One of the reception units 34-1 to 354-3 is connected to each of the A/D conversion units 354-1 to 354-3. The A/D conversion units 354-1 to 354-3 convert analog electrical signals into digital electrical signals. The digital signal processor 355 implements, for example, the function of the AMCC signal separation unit 35 in FIG. 4, and separates and acquires the AMCC signal.

In the above configuration, in the subscriber device (for example, the subscriber device 20-*n*) on the receiving side, the signal is output from either the current-voltage conversion unit 22-*n* or the equivalent amplifier 23-*n* to the LPF 25-*n*. A similar effect can also be obtained by installing a two-branch optical splitter in front of the reception unit 21-*n* and performing AMCC separation in the optical region received by each of the reception units 21-*n* for the main signal and the AMCC signal.

A wavelength multiplexing unit that collectively bundles the optical transmission lines 40-1 to 40-3 may be provided, and a one-core bidirectional configuration may be employed.

Although the configuration in which the AMCC signal is used as the control management signal has been described, the present invention is not limited thereto. For example, when the control management signal is an out-of-band management control signal using a frequency band different from that of the main signal, a similar effect can be obtained.

Figure 17:
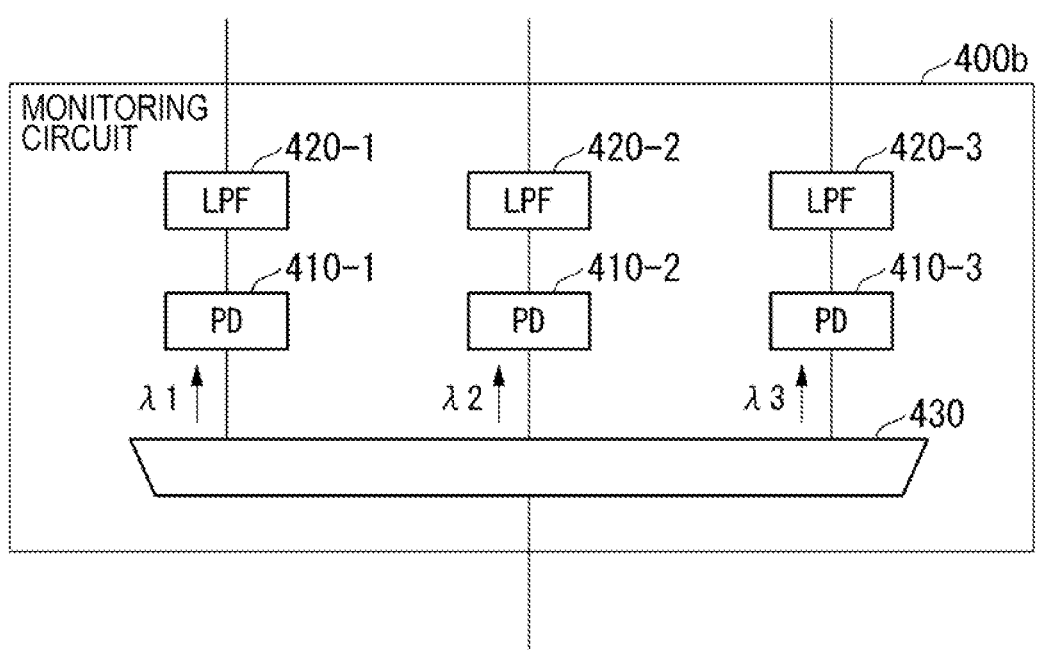
FIG. 17 is a diagram illustrating a specific configuration of a conventional monitoring circuit.

As illustrated in FIG. 17, the monitoring circuit 31 may be configured to include a wavelength demultiplexing unit 430 to separate the optical signal for each wavelength. When configured in this way, the optical access system 1 may further include an optical coupler. The optical coupler is a terminal with n inputs and one output. When the optical access system 1 includes an optical coupler, the optical coupler inputs the optical signal split by the power splitter 50-*n* and outputs the optical signal to the management control device 30 via the optical fiber. That is, the optical coupler multiplexes the optical signals transmitted through the optical transmission lines 40-*n* and outputs the multiplexed optical signals to the management control device 30. The wavelength demultiplexing unit 430 demultiplexes the optical signal output from the optical coupler. The optical signal demultiplexed by the wavelength demultiplexing unit 430 is output from the port corresponding to the wavelength, and is input to the reception unit 34-*n* connected to the port.

Second Embodiment

In a second embodiment, a configuration in which a plurality of optical SWs and a plurality of optical multiplexers/demultiplexers are provided between opposing subscriber devices in addition to the configuration of the first embodiment will be described.

Figure 10:
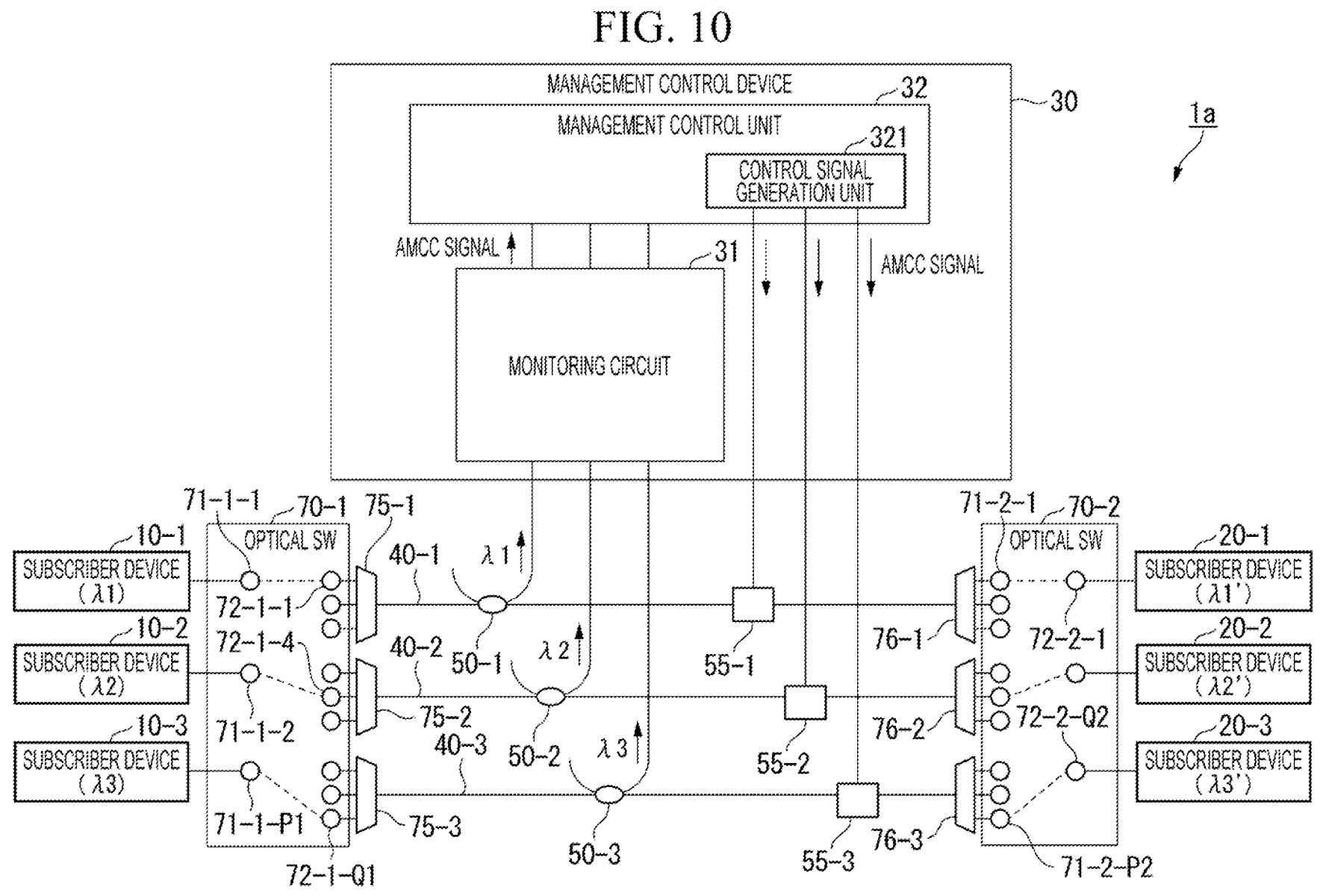

FIG. 10 is a diagram illustrating a configuration example of an optical access system 1*a* according to the second embodiment. The optical access system 1*a* includes a plurality of subscriber devices 10-1 to 10-3, a plurality of subscriber devices 20-1 to 20-3, a management control device 30, a plurality of power splitters 50-1 to 50-3, a plurality of control signal superimposing units 55-1 to 55-3, a plurality of optical SWs 70-1 and 70-2, and a plurality of optical multiplexers/demultiplexers 75-1 to 75-3 and 76-1 to 76-3.

The optical multiplexers/demultiplexers 75-1 to 75-3 and 76-1 to 76-3 may be, for example, 1×N arrayed waveguide gratings (AWG), and output optical signals input with different wavelengths from a single port or output optical signals having different wavelengths input from a single port from ports corresponding to the wavelengths of the optical signals, respectively.

The optical access system 1*a* has a configuration different from that of the optical access system 1 in that optical SWs 70-1 and 70-2 and optical multiplexers/demultiplexers 75-1 to 75-3 and 76-1 to 76-3 are further provided. Other configurations of the optical access system 1*a* are similar to those of the optical access system 1. Therefore, differences from the optical access system 1 will be mainly described below.

The optical SW 70-1 includes ports 71-1-1 to 71-1-P1 (where P1 is an integer of 2 or more) and ports 72-1-1 to 72-1-Q1 (where Q1 is an integer of 2 or more). When any of the ports 71-1-1 to 71-1-P1 is not specified, or collectively referred to as a port 71-1. When any of the ports 72-1-1 to 72-1-Q1 is not specified, or collectively referred to as a port 72-1.

The plurality of subscriber devices 10-1 to 10-3 are connected to the port 71-1 of the optical SW 70-1 via optical transmission lines, and the plurality of optical multiplexers/demultiplexers 75-1 to 75-3 are connected to the port 72-1 of the optical SW 70-1 via optical transmission lines. An optical signal input to a certain port of the optical SW 70-1 is output from another port.

The optical SW 70-2 includes ports 71-2-1 to 71-2-P2 (where P2 is an integer of 2 or more) and ports 72-2-1 to 72-2-Q2 (where Q2 is an integer of 2 or more). When any of the ports 71-2-1 to 71-2-P2 is not specified, or collectively referred to as a port 71-2. When any of the ports 72-2-1 to 72-2-Q2 is not specified, or collectively referred to as a port 72-2.

The plurality of optical multiplexers/demultiplexers 76-1 to 76-3 are connected to the port 71-2 of the optical SW 70-2 via optical transmission lines, and the plurality of subscriber devices 20-1 to 20-3 are connected to the port 72-2 of the optical SW 70-2 via optical transmission lines. An optical signal input to a certain port of the optical SW 70-2 is output from another port.

Optical multiplexers/demultiplexers 75-$n$ and 76-$n$ multiplex or demultiplex the input optical signals. The optical multiplexer/demultiplexer 75-$n$ is provided between the optical SW 70-1 and the optical transmission line 40-$n$. The optical multiplexer/demultiplexer 76-$n$ is provided between the optical SW 70-2 and the optical transmission line 40-$n$. The optical multiplexers/demultiplexers 75-$n$ and 76-$n$ are provided for respective optical transmission lines 40, for example.

In the optical multiplexer/demultiplexer 75-$n$, a plurality of ports (in FIG. 10, there are three ports, ports to which optical signals having wavelengths $\lambda 1$, $\lambda 2$, and $\lambda 3$ are input from above) corresponding to the number of wavelengths used by the subscriber device 10 are connected to the port 72-1 of the optical SW 70-1. In the optical multiplexer/demultiplexer 76-$n$, a plurality of ports (in FIG. 10, there are three ports, ports to which optical signals having wavelengths $\lambda 1$, $\lambda 2$, and $\lambda 3$ are input from above) corresponding to the number of wavelengths used by the subscriber device 20 are connected to the port 71-2 of the optical SW 70-2.

Next, a flow of processing of the optical access system 1$a$ according to the second embodiment will be described.

The respective subscriber devices 10-1 to 10-3 transmit optical signals having different wavelengths. Specifically, the subscriber device 10-1 transmits an optical signal having a wavelength $\lambda 1$ generated by superimposing an AMCC signal up-converted to a frequency f1 on the main signal to an optical transmission line 40-1, the subscriber device 10-2 transmits an optical signal having a wavelength $\lambda 2$ generated by superimposing an AMCC signal up-converted to a frequency f2 on the main signal to an optical transmission line 40-2, and the subscriber device 10-3 transmits an optical signal having a wavelength $\lambda 3$ generated by superimposing an AMCC signal up-converted to a frequency f3 on the main signal to an optical transmission line 40-3.

Optical signals having different wavelengths transmitted from the respective subscriber devices 10-1 to 10-3 are input to the optical SW 70-1. For example, an optical signal having a wavelength $\lambda 1$ transmitted from the subscriber device 10-1 is input to the port 71-1-1 of the optical SW 70-1. Similarly, an optical signal having a wavelength $\lambda 2$ transmitted from the subscriber device 10-2 is input to the port 71-1-2 of the optical SW 70-1. Similarly, an optical signal having a wavelength $\lambda 3$ transmitted from the subscriber device 10-3 is input to the port 71-1-P1 (for example, P1 is 3) of the optical SW 70-1.

It is assumed that a connection relationship between the port 71 and the port 72 in the optical SW 70-1 is set in advance. In FIG. 10, the port 71-1-1 and the port 72-1-1 are connected, the port 71-1-2 and the port 72-1-4 are connected, and the port 71-1-P1 and the port 72-1-Q1 (for example, Q1 is 9) are connected. Therefore, the optical signal having the wavelength $\lambda 1$ input to the port 71-1-1 is output from the port 72-1-1, the optical signal having the wavelength $\lambda 2$ input to the port 71-1-2 is output from the port 72-1-4, and the optical signal having the wavelength $\lambda 3$ input to the port 71-1-P1 is output from the port 72-1-Q1.

The optical multiplexer/demultiplexer 75-1 is connected to the port 72-1-1. Therefore, the optical multiplexer/demultiplexer 75-1 outputs the optical signal having the wavelength $\lambda 1$ output from the port 72-1-1 to the optical transmission line 40-1. The optical multiplexer/demultiplexer

75-2 is connected to the port 72-1-4. Therefore, the optical multiplexer/demultiplexer 75-2 outputs the optical signal having the wavelength $\lambda 2$ output from the port 72-1-4 to the optical transmission line 40-2. The optical multiplexer/demultiplexer 75-3 is connected to the port 72-1-Q1. Therefore, the optical multiplexer/demultiplexer 75-3 outputs the optical signal having the wavelength $\lambda 3$ output from the port 72-1-Q1 to the optical transmission line 40-3.

The optical signal output from the optical multiplexer/demultiplexer 75-1 is input to the power splitter 50-1 via the optical transmission line 40-1. The power splitter 50-1 splits the input optical signal having the wavelength $\lambda 1$ into a first path and a second path. Accordingly, the optical signal having the wavelength $\lambda 1$ is input to the monitoring circuit 31 and the control signal superimposing unit 55-1.

The optical signal output from the optical multiplexer/demultiplexer 75-2 is input to the power splitter 50-2 via the optical transmission line 40-2. The power splitter 50-2 splits the input optical signal having the wavelength $\lambda 2$ into a first path and a second path. Accordingly, the optical signal having the wavelength $\lambda 2$ is input to the monitoring circuit 31 and the control signal superimposing unit 55-2.

The optical signal output from the optical multiplexer/demultiplexer 75-3 is input to the power splitter 50-3 via the optical transmission line 40-3. The power splitter 50-3 splits the input optical signal having the wavelength $\lambda 3$ into a first path and a second path. Accordingly, the optical signal having the wavelength $\lambda 3$ is input to the control signal superimposing unit 55-3. Since the processing performed by the management control device 30 is similar to that of the first embodiment, the description thereof will be omitted.

The control signal generation unit 321 of the management control unit 32 generates a baseband AMCC signal addressed to the subscriber device 20-$n$. The control signal generation unit 321 transmits the generated baseband AMCC signal to the control signal superimposing unit 55-$n$. For example, the control signal generation unit 321 transmits a baseband AMCC signal addressed to the subscriber device 20-1 to the control signal superimposing unit 55-1.

The optical signal split into the second path by the power splitter 50-1 is input to the control signal superimposing unit 55-1. The control signal superimposing unit 55-1 superimposes the baseband AMCC signal transmitted from the control signal generation unit 321 on the input optical signal. The control signal superimposing unit 55-1 outputs the superimposed optical signal to the optical transmission line 40-1. The superimposed optical signal having the wavelength $\lambda 1$ output to the optical transmission line 40-1 is input to the optical multiplexer/demultiplexer 76-1.

The optical multiplexer/demultiplexer 76-1 demultiplexes the input optical signal having the wavelength $\lambda 1$. The optical signal having the wavelength $\lambda 1$ demultiplexed by the optical multiplexer/demultiplexer 76-1 is input to the port 71-2-1 of the optical SW 70-2. The optical signal input to the port 71-2-1 of the optical SW 70-2 is output from the port 72-2-1 connected to the port 71-2-1 and transferred to the subscriber device 20-1.

The subscriber device 20-1 receives the transferred optical signal having the wavelength $\lambda 1$. The subscriber device 20-1 acquires the main signal and the AMCC signal superimposed by the control signal generation unit 321 from the received optical signal. Since a specific method is similar to that of the first embodiment, the description thereof will be omitted.

According to the optical access system 1$a$ configured as described above, effects similar to those of the first embodiment can be obtained.

Further, in the optical access system 1*a*, the optical SWs 70-1 and 70-2 are provided in the optical transmission line 40 connecting the subscriber device 10 and the subscriber device 20. Accordingly, the optical signal transmitted from the subscriber device 10 can be transmitted by switching the path. Even in a case where the path is switched by the optical SW 70-1 and optical signals having different wavelengths are transmitted through the same optical transmission line 40, the AMCC signal superimposed by the control signal superimposing unit 55-*n* has a frequency different from that of the already superimposed AMCC signal and thus there is no interference. Therefore, it is possible to suppress interference with the main signal on which the AMCC signal is superimposed and further superimpose another AMCC signal on the main signal.

Third Embodiment

In the first and second embodiments, the configuration in which the AMCC signal transmitted from the management control unit is superimposed on the optical signal transmitted from the subscriber device 10 to the subscriber device 20 has been described. In a third embodiment, a configuration in which an AMCC signal transmitted from a management control unit is superimposed in a case where bidirectional communication is performed between a subscriber device 10 and a subscriber device 20 will be described.

Figure 11:
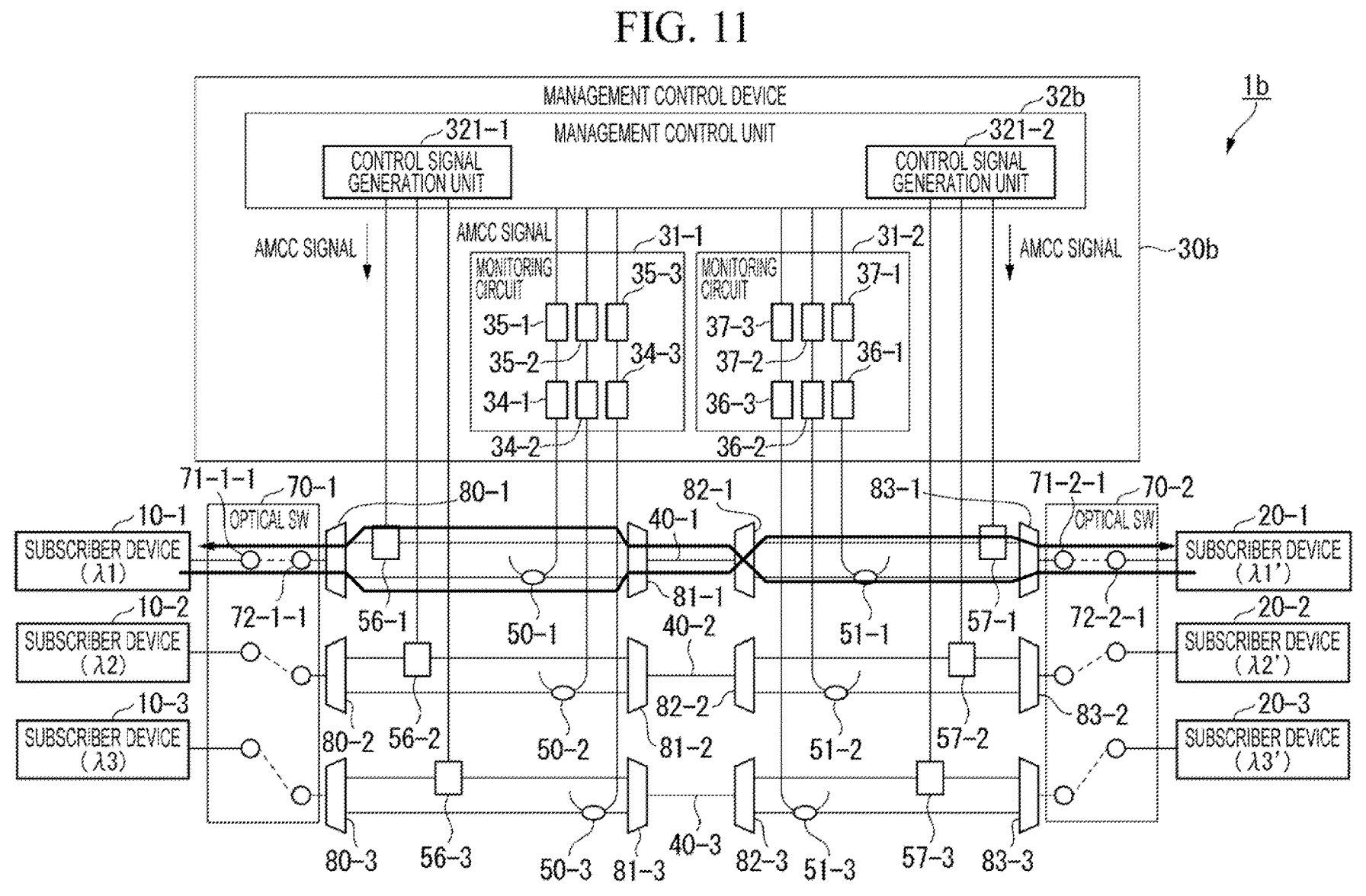

FIG. 11 is a diagram illustrating a configuration example of an optical access system 1*b* according to the third embodiment. The optical access system 1*b* includes a plurality of subscriber devices 10-1 to 10-3, a plurality of subscriber devices 20-1 to 20-3, a management control device 30*b*, a plurality of power splitters 50-1 to 50-3 and 51-1 to 51-3, a plurality of control signal superimposing units 56-1 to 56-3 and 57-1 to 57-3, a plurality of optical SWs 70-1 and 70-2, and a plurality of optical multiplexers/ demultiplexers 80-1 to 80-3, 81-1 to 81-3, 82-1 to 82-3, and 83-1 to 83-3. Differences from the optical access system 1*a* will be mainly described below. Note that the number of power splitters 50 and 51, control signal superimposing units 56 and 57, and optical multiplexers/demultiplexers 80, 81, 82, and 83 may be plural.

As in the first and second embodiments, the subscriber devices 10-1 to 10-3 transmit optical signals having wavelengths $\lambda 1$ to $\lambda 3$ in which AMCC signals having different frequencies f1 to f3 are superimposed on a main signal. Further, the subscriber devices 10-1 to 10-3 include functional units that receive optical signals transmitted from the respective subscriber devices 20-1 to 20-3. That is, the subscriber devices 10-1 to 10-3 further include a reception unit 21-*n*, a current-voltage conversion unit 22-*n*, an equivalent amplifier 23-*n*, a signal reproduction unit 24-*n*, and an LPF 25-*n* illustrated in FIG. 6 as optical reception units.

The subscriber devices 20-1 to 20-3 receive optical signals transmitted from the respective subscriber devices 10-1 to 10-3, similarly to the first and second embodiments. Further, the subscriber devices 20-1 to 20-3 transmit optical signals having wavelengths $\lambda 1'$ to $\lambda 3'$ in which AMCC signals having different frequencies f1' to f3' are superimposed on the main signal. That is, the subscriber devices 20-1 to 20-3 further include the optical transmission unit 11-*n* illustrated in FIG. 2 or FIG. 3.

The subscriber device 10-*n* and the subscriber device 20-*n* may have the same or different AMCC signal superimposition methods.

The management control device 30*b* monitors the AMCC signal and performs control based on the AMCC signal. The management control device 30*b* includes a plurality of monitoring circuits 31-1 and 31-2 and a management control unit 32*b*. The monitoring circuits 31-1 and 31-2 have the same configuration as the monitoring circuit 31. For example, the monitoring circuit 31-1 includes a plurality of reception units 34-1 to 34-3, and a plurality of AMCC signal separation units 35-1 to 35-3. For example, the monitoring circuit 31-2 includes a plurality of reception units 36-1 to 36-3, and a plurality of AMCC signal separation units 37-1 to 37-3. The functional units provided in the monitoring circuits 31-1 and 31-2 have different reference signs, but perform the same processing as the functional units having the same names provided in the monitoring circuit 31. The monitoring circuit 31-1 extracts the AMCC signal from the optical signal transmitted from the subscriber device 10-*n*. The monitoring circuit 31-2 extracts the AMCC signal from the optical signal transmitted from the subscriber device 20-*n*.

The management control unit 32*b* receives the AMCC signal separated by the AMCC signal separation unit 35-1 or 35-2, and manages transmission/reception wavelengths and the like of the subscriber device 10-*n* or 20-*n* on the basis of the received AMCC signal. The management control unit 32*b* includes a plurality of control signal generation units 321-1 to 321-2. The control signal generation units 321-1 to 321-2 perform processing similar to that of the control signal generation unit 321.

The control signal generation unit 321-1 is connected to the control signal superimposing units 56-1 to 56-3 via electric lines. The control signal generation unit 321-1 transmits the generated AMCC signal to the control signal superimposing units 56-1 to 56-3. The control signal generation unit 321-1 generates an AMCC signal to be superimposed on the optical signal transmitted from the subscriber device 20-*n*. Therefore, the control signal generation unit 321-1 generates an AMCC signal that can be superimposed by a superimposition method different from the superimposition method used by the subscriber device 20. That is, the control signal generation unit 321-1 generates an AMCC signal having a frequency band different from the frequency of the AMCC signal superimposed by the subscriber device 20 as an AMCC signal that can be superimposed by the control signal superimposing units 56-1 to 56-3.

The control signal generation unit 321-2 is connected to the control signal superimposing units 57-1 to 57-3 via electric lines. The control signal generation unit 321-2 transmits the generated AMCC signal to the control signal superimposing units 57-1 to 57-3. The control signal generation unit 321-2 generates an AMCC signal to be superimposed on the optical signal transmitted from the subscriber device 10-*n*. Therefore, the control signal generation unit 321-2 generates an AMCC signal that can be superimposed by a superimposition method different from the superimposition method used by the subscriber device 10. That is, the control signal generation unit 321-2 generates an AMCC signal having a frequency band different from the frequency of the AMCC signal superimposed by the subscriber device 10 as an AMCC signal that can be superimposed by the control signal superimposing units 57-1 to 57-3.

The power splitter 50-*n* splits the optical signal output from the optical multiplexer/demultiplexer 80-*n* into a first path toward the monitoring circuit 31-1 of the management control device 30*b* and a second path toward the optical multiplexer/demultiplexer 81-*n*. The optical signal having the wavelength $\lambda n$ split by the power splitter 50-*n* is input to the monitoring circuit 31-1 and the optical multiplexer/ demultiplexer 81-*n* of the management control device 30*b*.

The power splitter 51-$n$ splits the optical signal output from the optical multiplexer/demultiplexer 83-$n$ into a first path toward the monitoring circuit 31-2 of the management control device 30$b$ and a second path toward the optical multiplexer/demultiplexer 82-$n$. The optical signal having the wavelength $\lambda n'$ split by the power splitter 51-$n$ is input to the monitoring circuit 31-2 and the optical multiplexer/demultiplexer 82-$n$ of the management control device 30$b$.

The control signal superimposing units 56-1 to 56-3 superimpose the AMCC signal generated by the control signal generation unit 321-1 on the optical signal transmitted through the optical transmission line 40. The control signal superimposing units 56-1 to 56-3 superimpose the AMCC signal generated by the control signal generation unit 321-1 on the optical signal transmitted through the optical transmission line 40 by a superimposition method different from the superimposition method of the AMCC signal used by the subscriber device 20.

The control signal superimposing units 57-1 to 57-3 superimpose the AMCC signal generated by the control signal generation unit 321-2 on the optical signal transmitted through the optical transmission line 40. The control signal superimposing units 57-1 to 57-3 superimpose the AMCC signal generated by the control signal generation unit 321-2 on the optical signal transmitted through the optical transmission line 40 by a superimposition method different from the superimposition method of the AMCC signal used by the subscriber device 10.

The optical multiplexers/demultiplexers 80-1 to 80-3, 81-1 to 81-3, 82-1 to 82-3, and 83-1 to 83-3 may be, for example, 1×N AWG, and output optical signals having different wavelengths input from a single port or output optical signals having different wavelengths input from a single port from ports corresponding to the wavelengths of the optical signals, respectively.

The optical multiplexers/demultiplexers 80-$n$, 81-$n$, 82-$n$, and 83-$n$ multiplex of demultiplex the input optical signals. The optical multiplexers/demultiplexers 80-$n$ and 81-$n$ are provided, for example, between the optical SW 70-1 and the optical transmission line 40-$n$. The optical multiplexers/demultiplexers 82-$n$ and 83-$n$ are provided between the optical SW 70-2 and the optical transmission line 40-$n$.

A single port of the optical multiplexer/demultiplexer 80-$n$ is connected to the optical SW 70-1, and N ports of the optical multiplexer/demultiplexer 80-$n$ are connected to the control signal superimposing unit 56-$n$ and the power splitter 50-$n$. For example, the optical multiplexer/demultiplexer 80-$n$ demultiplexes the optical signal output from the optical SW 70-1, outputs the demultiplexed optical signal to the power splitter 50-$n$, and outputs the optical signal output from the control signal superimposing unit 56-$n$ to the optical SW 70-1.

A single port of the optical multiplexer/demultiplexer 81-$n$ is connected to the optical transmission line 40-$n$, and N ports of the optical multiplexer/demultiplexer 81-$n$ are connected to the control signal superimposing unit 56-$n$ and the power splitter 50-$n$. For example, the optical multiplexer/demultiplexer 81-$n$ demultiplexes the optical signal transmitted through the optical transmission line 40-$n$ and outputs the demultiplexed optical signal to the control signal superimposing unit 56-$n$, and outputs the optical signal split by the power splitter 50-$n$ to the optical transmission line 40-$n$.

A single port of the optical multiplexer/demultiplexer 82-$n$ is connected to the optical transmission line 40-$n$, and N ports of the optical multiplexer/demultiplexer 82-$n$ are connected to the control signal superimposing unit 57-$n$ and the power splitter 51-$n$. For example, the optical multiplexer/demultiplexer 82-$n$ demultiplexes the optical signal transmitted through the optical transmission line 40-$n$ and outputs the demultiplexed optical signal to the control signal superimposing unit 57-$n$, and outputs the optical signal split by the power splitter 51-$n$ to the optical transmission line 40-$n$.

A single port of the optical multiplexer/demultiplexer 83-$n$ is connected to the optical SW 70-2, and N ports of the optical multiplexer/demultiplexer 83-$n$ are connected to the control signal superimposing unit 57-$n$ and the power splitter 51-$n$. For example, the optical multiplexer/demultiplexer 83-$n$ demultiplexes the optical signal output from the optical SW 70-2, outputs the demultiplexed optical signal to the power splitter 51-$n$, and outputs the optical signal output from the control signal superimposing unit 57-$n$ to the optical SW 70-2.

Next, a flow of processing of the optical access system 1$b$ according to the third embodiment will be described. First, a flow of processing in a case where an optical signal is transmitted from the subscriber device 10-$n$ will be described. Here, the description will focus on the subscriber device 10-1.

The subscriber device 10-1 transmits an optical signal having a wavelength $\lambda 1$ generated by superimposing the AMCC signal up-converted to the frequency f1 on the main signal. The optical signal having the wavelength $\lambda 1$ transmitted from the subscriber device 10-1 is input to the optical SW 70-1. For example, an optical signal having a wavelength $\lambda 1$ transmitted from the subscriber device 10-1 is input to the port 71-1-1 of the optical SW 70-1.

It is assumed that a connection relationship between the port 71 and the port 72 in the optical SW 70-1 is set in advance. In FIG. 11, the port 71-1-1 and the port 72-1-1 are connected. Therefore, the optical signal having the wavelength $\lambda 1$ input to the port 71-1-1 is output from the port 72-1-1. The optical multiplexer/demultiplexer 80-1 is connected to the port 72-1-1. Therefore, the optical multiplexer/demultiplexer 80-1 demultiplexes the optical signal having the wavelength $\lambda 1$ output from the port 72-1-1 and outputs the demultiplexed optical signal to the optical transmission line provided with the power splitter 50-1.

The optical signal output from the optical multiplexer/demultiplexer 80-1 is input to the power splitter 50-1. The power splitter 50-1 splits the input optical signal having the wavelength $\lambda 1$ into a first path and a second path. Accordingly, the optical signal having the wavelength $\lambda 1$ is input to the reception unit 34-1 and the optical multiplexer/demultiplexer 81-1 of the monitoring circuit 31-1. Since the processing performed by the monitoring circuit 31-1 is similar to the functional units having the same names in the first and second embodiments, the description thereof will be omitted.

The optical signal split into the second path by the power splitter 50-1 is input to the optical multiplexer/demultiplexer 81-1. The optical multiplexer/demultiplexer 81-1 outputs the input optical signal to the optical transmission line 40-1. The optical signal having the wavelength $\lambda 1$ output to the optical transmission line 40-1 is input to the optical multiplexer/demultiplexer 82-1. The optical multiplexer/demultiplexer 82-1 demultiplexes the input optical signal and outputs the demultiplexed optical signal to the optical transmission line provided with the control signal superimposing unit 57-1.

The optical signal output from the optical multiplexer/demultiplexer 82-1 is input to the control signal superimposing unit 57-1. The control signal generation unit 321-2 of the management control unit 32$b$ generates a baseband AMCC signal addressed to the subscriber device 20-1. The control signal generation unit 321-2 transmits the generated baseband AMCC signal to the control signal superimposing unit 57-1. The control signal superimposing unit 57-1 superimposes the baseband AMCC signal transmitted from the control signal generation unit 321-2 on the optical signal output from the optical multiplexer/demultiplexer 82-1. The control signal superimposing unit 57-1 outputs the superimposed optical signal to the optical multiplexer/demultiplexer 83-1.

The optical multiplexer/demultiplexer 83-1 outputs the input superimposed optical signal to the port 71-2-1 of the optical SW 70-2. The optical signal input to the port 71-2-1 of the optical SW 70-2 is output from the port 72-2-1 connected to the port 71-2-1 and transferred to the subscriber device 20-1. Accordingly, the subscriber device 20-1 can acquire the main signal and the AMCC signal generated by the control signal generation unit 321-2.

Next, a flow of processing in a case where an optical signal is transmitted from the subscriber device 20-n will be described. Here, the description will focus on the subscriber device 20-1. The subscriber device 20-1 transmits an optical signal having a wavelength $\lambda 1'$ generated by superimposing the AMCC signal up-converted to the frequency f1' on the main signal. The optical signal having the wavelength $\lambda 1'$ transmitted from the subscriber device 20-1 is input to the optical SW 70-2. For example, the optical signal having the wavelength $\lambda 1'$ transmitted from the subscriber device 20-1 is input to the port 71-2-1 of the optical SW 70-2.

It is assumed that a connection relationship between the port 71 and the port 72 in the optical SW 70-2 is set in advance. In FIG. 11, the port 72-2-1 and the port 71-2-1 are connected. Therefore, the optical signal having the wavelength $\lambda 1'$ input to the port 72-2-1 is output from the port 71-2-1. The optical multiplexer/demultiplexer 83-1 is connected to the port 71-2-1. Therefore, the optical multiplexer/demultiplexer 83-1 demultiplexes the optical signal having the wavelength $\lambda 1'$ output from the port 71-2-1 and outputs the demultiplexed optical signal to the optical transmission line provided with the power splitter 51-1.

The optical signal output from the optical multiplexer/demultiplexer 83-1 is input to the power splitter 51-1. The power splitter 51-1 splits the input optical signal having the wavelength $\lambda 1'$ into a first path and a second path. Accordingly, the optical signal having the wavelength $\lambda 1'$ is input to the reception unit 36-1 and the optical multiplexer/demultiplexer 82-1 of the monitoring circuit 31-2. Since the processing performed by the monitoring circuit 31-2 is similar to the functional units having the same names in the first and second embodiments, the description thereof will be omitted.

The optical signal split into the second path by the power splitter 51-1 is input to the optical multiplexer/demultiplexer 82-1. The optical multiplexer/demultiplexer 82-1 outputs the input optical signal to the optical transmission line 40-1. The optical signal having the wavelength $\lambda 1'$ output to the optical transmission line 40-1 is input to the optical multiplexer/demultiplexer 81-1. The optical multiplexer/demultiplexer 81-1 demultiplexes the input optical signal and outputs the demultiplexed optical signal to the optical transmission line provided with the control signal superimposing unit 56-1.

The optical signal output from the optical multiplexer/demultiplexer 81-1 is input to the control signal superimposing unit 56-1. The control signal generation unit 321-1 of the management control unit 32b generates a baseband AMCC signal addressed to the subscriber device 10-1. The control signal generation unit 321-1 transmits the generated baseband AMCC signal to the control signal superimposing unit 56-1. The control signal superimposing unit 56-1 superimposes the baseband AMCC signal transmitted from the control signal generation unit 321-1 on the optical signal output from the optical multiplexer/demultiplexer 81-1. The control signal superimposing unit 56-1 outputs the superimposed optical signal to the optical multiplexer/demultiplexer 80-1.

The optical multiplexer/demultiplexer 80-1 outputs the input superimposed optical signal to the port 72-1-1 of the optical SW 70-1. The optical signal input to the port 72-1-1 of the optical SW 70-1 is output from the port 71-1-1 connected to the port 72-1-1 and transferred to the subscriber device 10-1. Accordingly, the subscriber device 10-1 can acquire the main signal and the AMCC signal generated by the control signal generation unit 321-1.

The optical access system 1b configured as described above can be applied even when bidirectional communication is performed.

Fourth Embodiment

In the first to third embodiments, the configuration in which the subscriber devices 10-n and 20-n superimpose the AMCC signal on the main signal by the "low-frequency pilot tone" method and the control signal superimposing unit 55 superimposes the AMCC signal on the main signal by the "baseband modulation" method has been described. In a fourth embodiment, a configuration in which the subscriber devices 10-n and 20-n superimpose the AMCC signal on the main signal by the "baseband modulation" method and the control signal superimposing unit 55 superimposes the AMCC signal on the main signal by the "low-frequency pilot tone" method will be described.

In the fourth embodiment, the system configuration is similar to that of the first to third embodiments. Hereinafter, differences from the first to third embodiments will be described.

Figure 12:
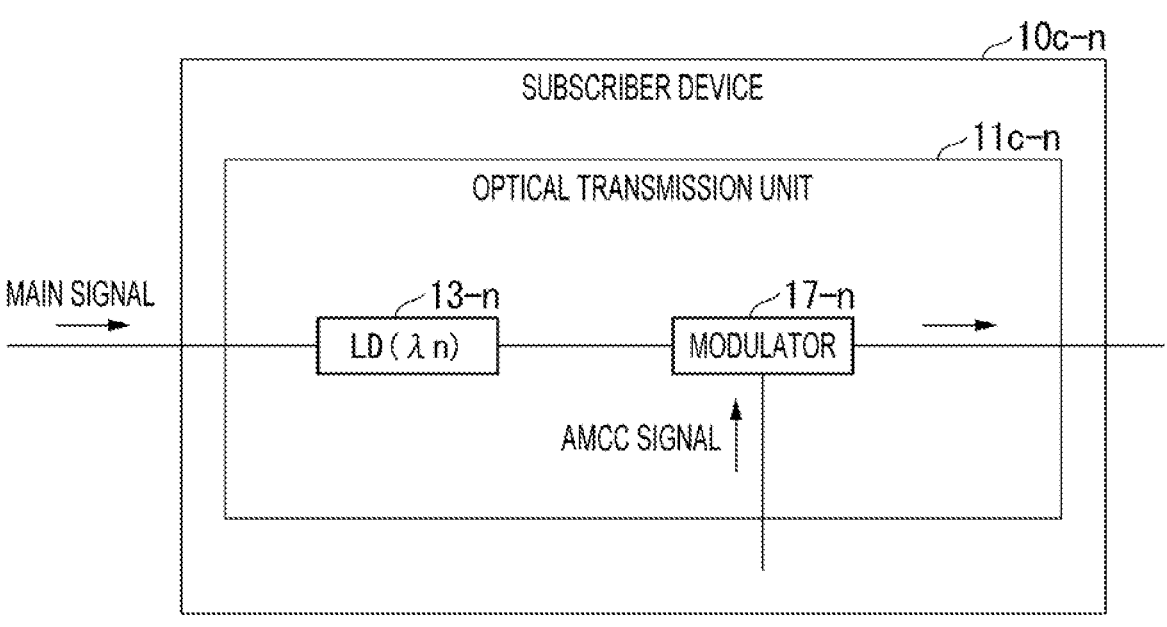
FIG. 12 is a diagram illustrating a configuration of a subscriber device according to a fourth embodiment.

A subscriber device 10c-n transmits an optical signal having a wavelength $\lambda n$ to the optical transmission line 40-n. For example, the subscriber device 10c-n transmits, to the optical transmission line 40-n, an optical signal having a wavelength $\lambda n$ obtained by superimposing an AMCC signal on the main signal by the "baseband modulation" method. In this case, the subscriber device 10c-n has the configuration illustrated in FIG. 12. FIG. 12 is a diagram illustrating a configuration of the subscriber device 10c-n according to the fourth embodiment. The subscriber device 10c-n includes an optical transmission unit 11c-n. The optical transmission unit 11c-n includes an LD 13-n and a modulator 17-n. The optical transmission unit 11c-n converts the electrical signal of the main signal input from the outside into an optical signal by the LD 13-n. Thereafter, the optical transmission unit 11c-n superimposes the AMCC signal on the optical signal at the optical stage using the modulator 17-n and outputs the superimposed signal to the optical fiber.

Figure 13:
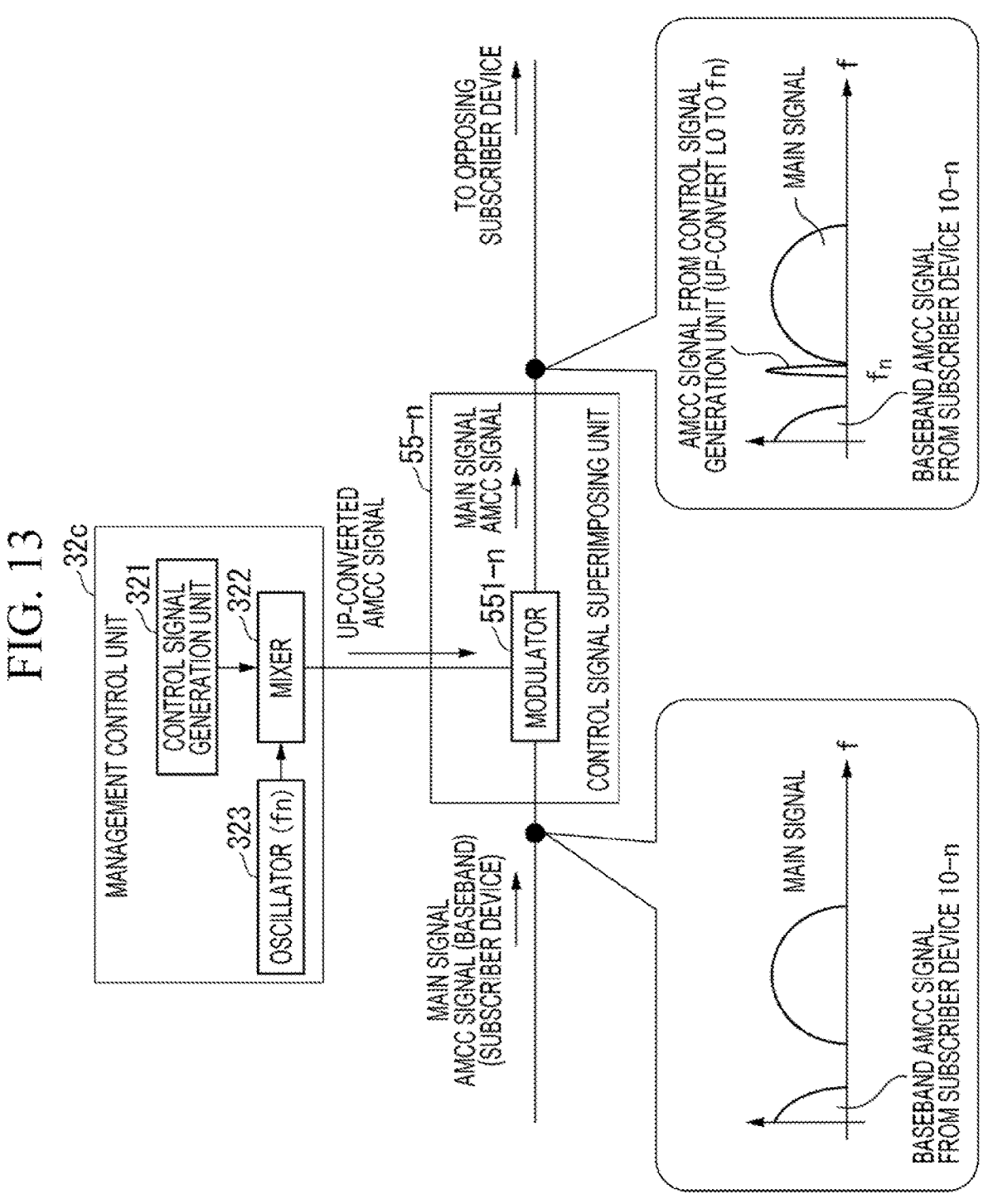
FIG. 13 is a diagram for describing a configuration and processing of a management control unit according to the fourth embodiment.
Figure 14:
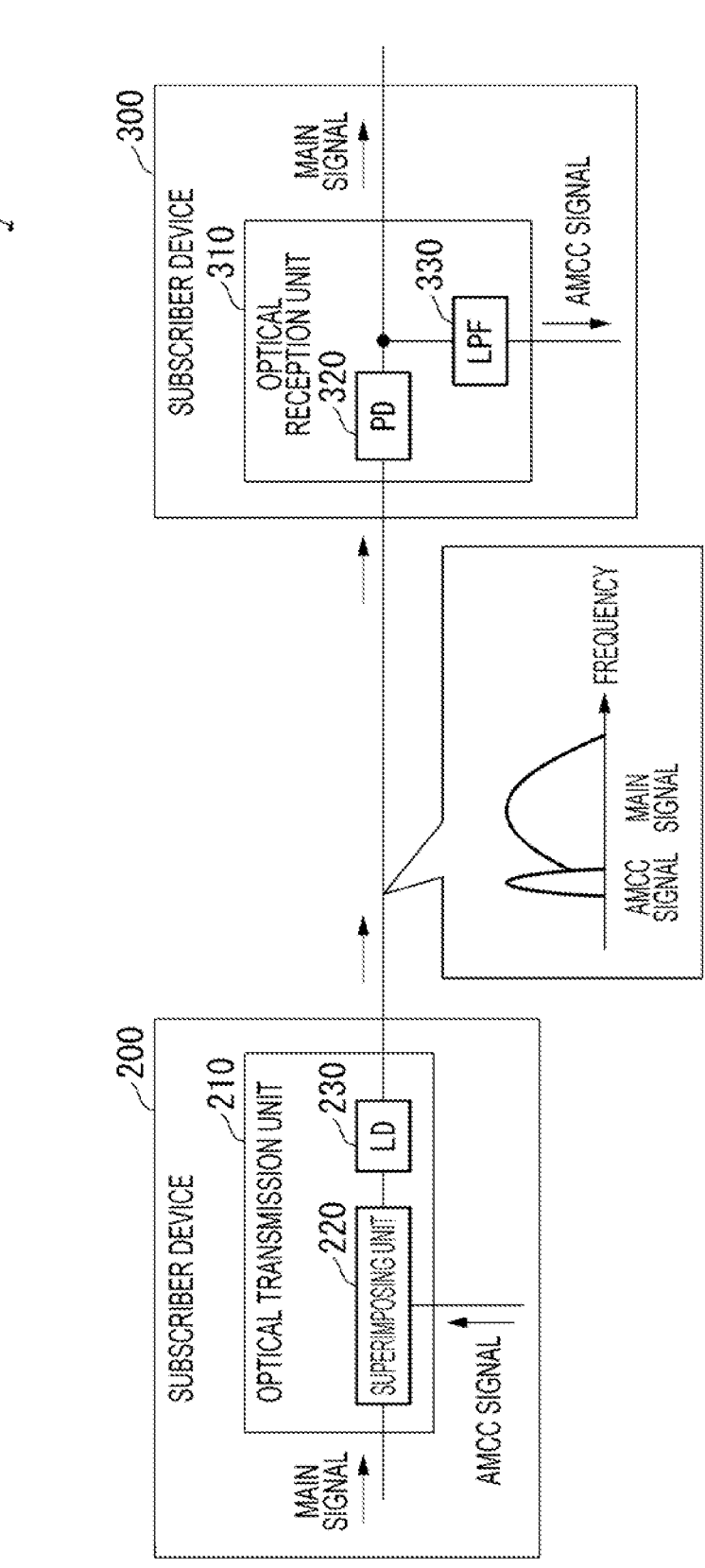
FIG. 14 is a diagram illustrating a configuration of a PtP WDM system using "low-frequency pilot tone".
Figure 15:
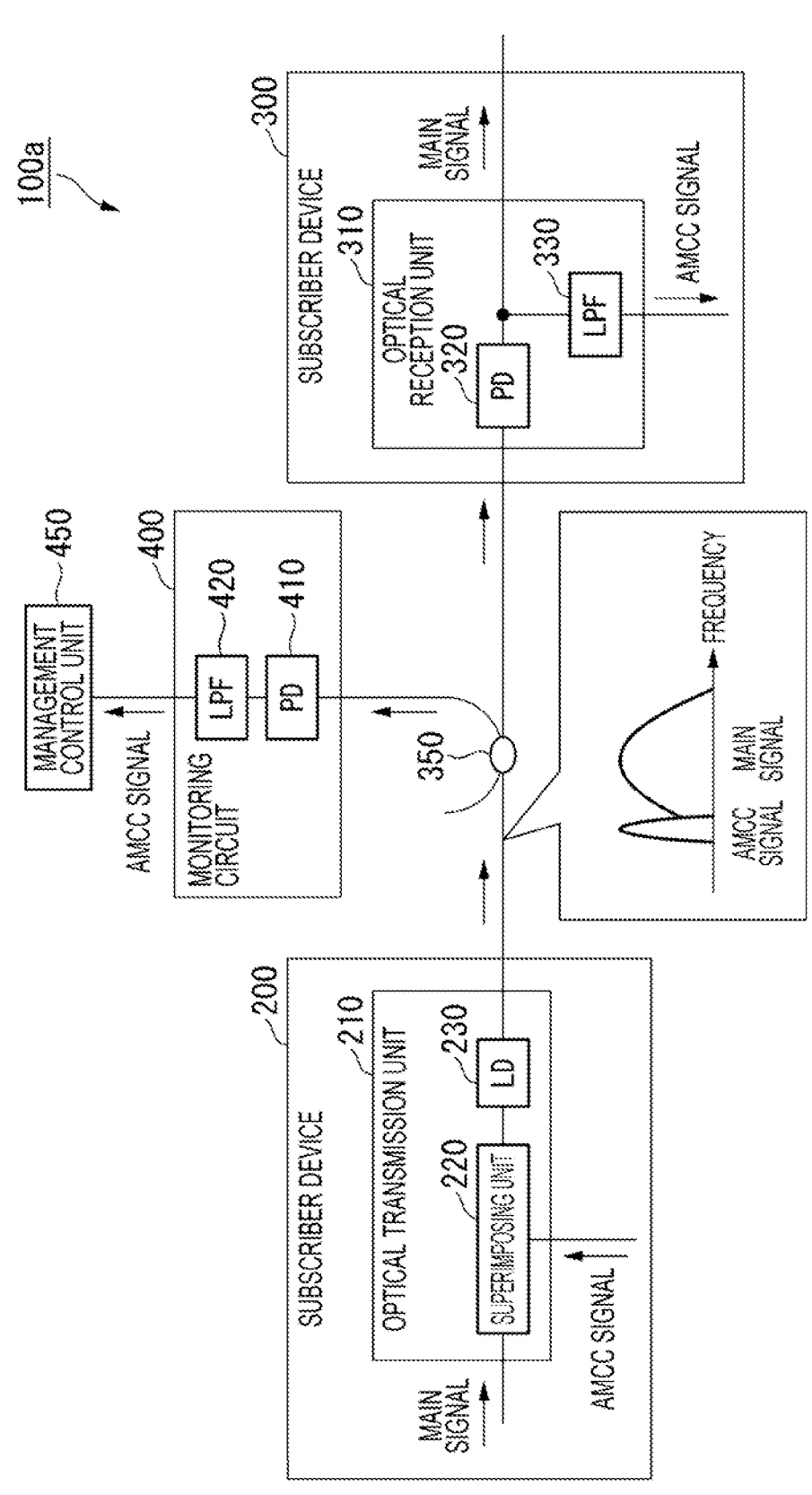
FIG. 15 is a diagram illustrating a configuration of another PtP WDM system.

As in the fourth embodiment, when the control signal superimposing unit 55 superimposes the AMCC signal on the main signal by the "low-frequency pilot tone" method, a management control unit 32c has the configuration illustrated in the configuration of FIG. 13. FIG. 13 is a diagram for describing the configuration and processing of the management control unit 32c in the fourth embodiment. The management control unit 32c includes a control signal generation unit 321, a mixer 322, and an oscillator 323. The management control unit 32c up-converts the AMCC signal, which is a low frequency signal generated by the control signal generation unit 321, to the frequency fn using the mixer 322 and the oscillator 323. The management control unit 32$c$ outputs the up-converted AMCC signal to the control signal superimposing unit 5S-$n$.

As illustrated in FIG. 13, the control signal superimposing unit 55-$n$ includes a modulator 551-$n$. The control signal superimposing unit 55-$n$ superimposes the AMCC signal up-converted by the management control unit 32$c$ on the optical signal at the optical stage using the modulator 551-$n$. As illustrated in FIG. 13, the optical signal input to the control signal superimposing unit 55-$n$ includes a baseband AMCC signal so as not to overlap the frequency component of the main signal in the subscriber device 10.

On the other hand, the AMCC signal up-converted by the management control unit 32$c$ is superimposed on the optical signal output from the control signal superimposing unit 55-$n$ at a position not overlapping the main signal and the baseband AMCC signal in the frequency domain. In this way, since the frequency of the AMCC signal generated by the management control unit 32$c$ is different from the AMCC signal included in the optical signal, interference can be suppressed and superimposition can be performed.

Further, in the fourth embodiment, the pass band of the LPF 25-$n$ in the subscriber device 20 on the receiving side of the optical signal needs to be the frequency band of the AMCC signal up-converted by the management control unit 32$c$.

Furthermore, in the fourth embodiment, the monitoring circuit 31 includes a PD and an LPF. Here, as the LPF, an LPF having a band near the baseband is used.

The processing of the fourth embodiment is implemented by replacing the subscriber device 10-$n$ illustrated in the first and second embodiments with the subscriber device 10$c$-$n$ illustrated in FIG. 12 and replacing the management control unit 32 and the control signal superimposing unit 55-$n$ illustrated in the first and second embodiments with the management control unit 32$c$ and the control signal superimposing unit 55-$n$ illustrated in FIG. 13. Furthermore, in the third embodiment, the subscriber device 10-$n$ is replaced with the subscriber device 10$c$-$n$ illustrated in FIG. 12, the management control unit 32$b$ illustrated in the third embodiment includes a plurality of configurations of the management control unit 32$e$ illustrated in FIG. 13, the control signal superimposing units 56-$n$ and 57-$n$ illustrated in the third embodiment are replaced with the configuration of the control signal superimposing unit 55 illustrated in FIG. 13, and the function of the subscriber device 10$c$-$n$ is included as the transmission function of the subscriber device 20-$n$, thereby implementing the processing of the fourth embodiment.

Modifications of First to Fourth Embodiments

The second to fourth embodiments may be modified similarly to the first embodiment. In the third embodiment, when an optical coupler is further provided similarly to the first embodiment, optical access system 1$b$ according to the third embodiment includes two optical couplers. One optical coupler C1 receives the optical signal split by the power splitter 50-$n$ and outputs the optical signal to the monitoring circuit 31-1 of the management control device 30$b$ via the optical fiber. The optical coupler C1 multiplexes the input optical signals and outputs the multiplexed optical signals to the monitoring circuit 31-1 of the management control device 30$b$. The other optical coupler C2 receives the optical signal split by the power splitter 51-$n$ and outputs the optical signal to the monitoring circuit 31-2 of the management control device 30$b$ via the optical fiber. The optical coupler C2 multiplexes the input optical signals and outputs the multiplexed optical signals to the monitoring circuit 31-2 of the management control device 30$b$. In this case, each of the monitoring circuits 31-1 and 31-2 includes a wavelength demultiplexing unit 430. The wavelength demultiplexing unit 430 included in the monitoring circuit 31-1 demultiplexes the optical signal output from the optical coupler C1. The wavelength demultiplexing unit 430 included in the monitoring circuit 31-2 demultiplexes the optical signal output from the optical coupler C2. The optical signal demultiplexed by the wavelength demultiplexing unit 430 is output from the port corresponding to the wavelength, and is input to the reception unit 34-$n$ or 36-$n$ connected to the port.

The control signal superimposing unit 55-$n$ may superimpose (perform sub-carrier multiplexing (SCM) on) an AMCC signal having a frequency band different from the frequency of the AMCC signal superimposed by the subscriber devices 10 and 20.

In the second embodiment, the power splitter 50-$n$ and the control signal superimposing unit 55-$n$ may be provided between the optical SW 70-1 and the optical multiplexer/demultiplexer 75-$n$ or between the optical SW 70-2 and the optical multiplexer/demultiplexer 76-$n$. In the third embodiment, the power splitter 50-$n$ and the control signal superimposing unit 56-$n$ may be provided between the optical SW 70-1 and the optical multiplexer/demultiplexer 80-$n$, and the power splitter 51-$n$ and the control signal superimposing unit 57-$n$ may be provided between the optical SW 70-2 and the optical multiplexer/demultiplexer 83-$n$.

Some functional units of the management control devices 30 and 30$b$ in the above-described embodiments may be implemented by computers. In such a case, a program for implementing the functions may be recorded in a computer-readable recording medium, and the functions may be implemented by loading the program recorded on this recording medium to a computer system, and executing the program. Note that the "computer system" mentioned herein includes an OS and hardware such as peripheral devices.

Also, the "computer-readable recording medium" is a portable medium such as a flexible disk, a magneto-optical disc, a ROM, or a CD-ROM, or a storage device such as a hard disk embedded in the computer system. Further, the "computer-readable recording medium" may include a medium that dynamically holds the program for a short time, such as a communication line in a case where the program is transmitted via a network such as the Internet or a communication line such as a telephone line, and a medium that holds the program for a certain period of time, such as a volatile memory inside a computer system serving as a server or a client in that case. Also, the foregoing program may be for implementing some of the functions described above, may be implemented in a combination of the functions described above and a program already recorded in a computer system, or may be implemented with a programmable logic device such as a field programmable gate array (FPGA).

Although the embodiments of the present invention have been described in detail with reference to the drawings, specific configurations are not limited to the embodiments, and include design and the like within the scope of the present invention without departing from the gist of the present invention.

INDUSTRIAL APPLICABILITY

The present invention can be applied to a technique of further superimposing a management control signal on an optical signal on which the management control signal (AMCC signal) is superimposed.

REFERENCE SIGNS LIST

10-1 to 10-3, 20-1 to 20-3 Subscriber device
11-$n$ Optical transmission unit
12-$n$ AMCC signal superimposing unit
13-$n$ LD
15-$n$ Mixer
16-$n$ Oscillator
17-$n$ Modulator
21-$n$ Reception unit
22-$n$ Current-voltage conversion unit
23-$n$ Equivalent amplifier
24-$n$ Signal reproduction unit
25-$n$ LPF
30, 30$b$ Management control device
31, 31-1 to 31-2 Monitoring circuit
32, 32$b$ Management control unit
34, 34-1 to 34-3, 36, 36-1 to 36-3 Reception unit
35, 35-1 to 35-3, 37, 37-1 to 37-3 AMCC signal separation unit
50-1 to 50-3, 51-1 to 51-3 Power splitter
55, 56-1 to 56-3, 57-1 to 57-3 Control signal superimposing unit
70-1 to 70-2 Optical SW
75-1 to 75-3, 76-1 to 76-3, 80-1 to 80-3, 81-1 to 81-3, 82-1 to 82-3, 83-1 to 83-3 Optical multiplexer/demultiplexer
321, 321-1 to 321-2 Control signal generation unit
351-1 to 351-3 Oscillator
352-1 to 352-3 Mixer
353-1 to 353-3 LPF
354 A/D conversion unit
355 Digital signal processor
551-$n$ Modulator

The invention claimed is:

1. An optical access system that performs communication using an optical signal on which a management control signal used for management and control is superimposed, the optical access system comprising:
   a subscriber device on a transmitting side and having an optical transmitter, where the optical transmitter is configured to generate an optical signal by superimposing a first management control signal on a main signal and transmits the generated optical signal;
   a management controller configured to output a second management control signal addressed to a communication counterpart of the subscriber device on a transmitting side, which is superimposed on the optical signal transmitted by the subscriber device on the transmitting side and which has a frequency band different from a frequency of the first management control signal superimposed on the optical signal and contains control content different from the first management control signal; and
   a control signal superimposer configured to superimpose the second management control signal output from the management controller on the optical signal.

2. The optical access system according to claim 1, wherein the second management controller outputs the management control signal for the subscriber device on the transmitting side to superimpose the second management control signal by a superimposition method different from a superimposition method for superimposing the first management control signal on a main signal.

3. The optical access system according to claim 2, wherein the management controller acquires the superimposition method of the subscriber device on the transmitting side by acquiring the superimposition method from the subscriber device on the transmitting side at a timing at which the subscriber device on the transmitting side is connected or determining the superimposition method used by the subscriber device on the transmitting side in advance.

4. The optical access system according to claim 1, further comprising:
   a splitter configured to split an optical signal transmitted from the subscriber device on the transmitting side on an optical transmission line connecting the subscriber device on the transmitting side and a subscriber device on a receiving side; and
   a monitor configured to acquire the first management control signal from the optical signal split by the splitter,
   wherein the control signal superimposer superimposes the second management control signal output from the management controller on the optical signal split by the splitter.

5. The optical access system according to claim 4, wherein the subscriber device on the receiving side includes a receiver configured to convert the received optical signal into an electrical signal, and a filter configured to acquire the second management control signal superimposed by the control signal superimposer based on the electrical signal.

6. The optical access system according to claim 1, further comprising:
   wherein the subscriber device on a transmitting side is a plurality of subscriber devices on the transmitting side;
   an optical switch configured to connect to the plurality of subscriber devices on the transmitting side; and
   an optical multiplexer/demultiplexer configured to multiplex the optical signal output from the optical switch, and demultiplexes the optical signal transmitted from a transmission line.

7. The optical access system according to claim 1, wherein the subscriber device on the transmitting side is a subscriber device on a first transmitting side and a subscriber device on a second transmitting side, the control signal superimposer is a first control signal superimposer corresponding to the subscriber device on the first transmitting side and a second control signal superimposer corresponding to the subscriber device on the second transmitting side, the subscriber device on the first transmitting side and the subscriber device on the second transmitting side are provided at opposing positions, and transmit optical signals having different wavelengths, the management controller outputs a management control signal addressed to the subscriber device on the first transmitting side to the second control signal superimposer, and outputs a management control signal addressed to the subscriber device on the second transmitting side to the first control signal superimposer, the first control signal superimposer superimposes a management control signal addressed to the subscriber device on the second transmitting side on an optical signal transmitted by the subscriber device on the first transmitting side, and the second control signal superimposer superimposes a management control signal addressed to the subscriber device on the first transmitting side on an optical signal transmitted by the subscriber device on the second transmitting side.

8. A control signal superimposition method in an optical access system that performs communication using an optical signal on which a management control signal used for management and control is superimposed, the control signal superimposition method comprising:

generating, by a subscriber device on a transmitting side, an optical signal by superimposing a first management control signal on a main signal and transmitting, by the subscriber device on the transmitting side, the generated optical signal;

outputting a second management control signal addressed to a communication counterpart of the subscriber device on a transmitting side, which is superimposed on the optical signal transmitted by the subscriber device on the transmitting side and which has a frequency band different from a frequency of the first management control signal superimposed on the optical signal and contains control content different from the first management control signal; and superimposing the output second management control signal on the optical signal.

* * * * *